United States Patent
Wang et al.

(10) Patent No.: US 11,209,027 B2
(45) Date of Patent: *Dec. 28, 2021

(54) METHODS AND APPARATUS TO ENABLE BOOM BOUNCE REDUCTION AND PREVENT UN-COMMANDED MOTION IN HYDRAULIC SYSTEMS

(71) Applicant: Eaton Intelligent Power Limited, Dublin (IE)

(72) Inventors: Meng Wang, Eden Prairie, MN (US); Michael Berne Rannow, Eden Prairie, MN (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/442,696

(22) Filed: Jun. 17, 2019

(65) Prior Publication Data
US 2020/0003239 A1   Jan. 2, 2020

Related U.S. Application Data

(63) Continuation of application No. 15/326,395, filed as application No. PCT/US2015/040636 on Jul. 15, 2015, now Pat. No. 10,323,663.
(Continued)

(51) Int. Cl.
*F15B 21/00* (2006.01)
*F15B 11/044* (2006.01)
(Continued)

(52) U.S. Cl.
CPC .......... *F15B 21/008* (2013.01); *B66C 13/066* (2013.01); *E04G 21/0454* (2013.01);
(Continued)

(58) Field of Classification Search
CPC .............. F15B 11/0445; F15B 13/01; F15B 2211/30515; F15B 21/008; B16C 13/066; E02F 9/2207
See application file for complete search history.

(56) References Cited

U.S. PATENT DOCUMENTS 3,917,246 A   11/1975   Gartner et al.
4,621,375 A   11/1986   Simnovec
(Continued)

FOREIGN PATENT DOCUMENTS

CN   201670158 U   12/2010
CN   202322251 U   7/2012
(Continued)

OTHER PUBLICATIONS

Extended European Search Report for Application No. 14803575.1 dated Dec. 20, 2016.
(Continued)

*Primary Examiner* — Abiy Teka
*Assistant Examiner* — Daniel S Collins
(74) *Attorney, Agent, or Firm* — Merchant & Gould P.C.

(57) ABSTRACT

A hydraulic system (600) and method for reducing boom dynamics of a boom (30), while providing counter-balance valve protection, includes a hydraulic actuator (110), first and second counter-balance valves (300, 400), first and second independent control valves (700, 800), and first and second blocking valves (350, 450). The actuator includes first and second corresponding chambers. In a first mode, the second counter-balance valve is opened by the first control valve, and the first counter-balance valve is opened by the second control valve. In a second mode, at least one of the counter-balance valves is closed. A meter-out control valve (800, 700) may be operated in a flow control mode, and/or a meter-in control valve (700, 800) may be operated in a
(Continued)

pressure control mode. Boom dynamics reduction may occur while the boom is in motion (e.g., about a worksite). By opening the counter-balance valves, sensors at the control valves may be used to characterize external loads. The control valves may respond to the external loads and at least partially cancel unwanted boom dynamics. The system may further detecting faults in actuators with counter-balance valves and prevent any single point fault from causing a boom falling event and/or mitigate such faults.

19 Claims, 5 Drawing Sheets

Related U.S. Application Data

(60) Provisional application No. 62/024,643, filed on Jul. 15, 2014, provisional application No. 62/024,666, filed on Jul. 15, 2014.

(51) Int. Cl.
*F15B 11/042* (2006.01)
*F16K 31/42* (2006.01)
*B66C 13/06* (2006.01)
*F15B 11/00* (2006.01)
*E04G 21/04* (2006.01)
*F15B 19/00* (2006.01)

(52) U.S. Cl.
CPC .......... *F15B 11/003* (2013.01); *F15B 11/042* (2013.01); *F15B 11/0445* (2013.01); *F15B 19/005* (2013.01); *F16K 31/426* (2013.01); *F15B 2211/3057* (2013.01); *F15B 2211/30515* (2013.01); *F15B 2211/329* (2013.01); *F15B 2211/355* (2013.01); *F15B 2211/5059* (2013.01); *F15B 2211/50509* (2013.01); *F15B 2211/526* (2013.01); *F15B 2211/632* (2013.01); *F15B 2211/634* (2013.01); *F15B 2211/6313* (2013.01); *F15B 2211/6658* (2013.01); *F15B 2211/855* (2013.01); *F15B 2211/8616* (2013.01); *F15B 2211/8636* (2013.01); *F15B 2211/8752* (2013.01)

(56) References Cited

U.S. PATENT DOCUMENTS

| | | | |
|---|---|---|---|
| 4,896,582 A | 1/1990 | Tordenmalm et al. |
| 5,048,296 A | 9/1991 | Sunamura et al. |
| 5,191,826 A | 3/1993 | Brunner |
| 5,230,272 A | 7/1993 | Schmitz |
| 5,245,826 A | 9/1993 | Roth et al. |
| 5,571,226 A | 11/1996 | Kobayashi |
| 5,640,996 A | 6/1997 | Schlecht et al. |
| 5,699,386 A | 12/1997 | Measor et al. |
| 5,715,865 A | 2/1998 | Wilke |
| 5,784,944 A | 7/1998 | Tozawa et al. |
| 5,832,730 A | 11/1998 | Mizui |
| 5,996,465 A | 12/1999 | Morikawa et al. |
| 6,202,013 B1 | 3/2001 | Anderson et al. |
| 6,328,173 B1 | 12/2001 | Wimmer |
| 6,634,172 B2 | 10/2003 | Schoonmaker et al. |
| 6,883,532 B2 | 4/2005 | Rau |
| 7,143,682 B2 | 12/2006 | Nissing et al. |
| 7,269,947 B2 | 9/2007 | Yoshino |
| 7,278,262 B2 | 10/2007 | Moon |
| 7,296,404 B2 | 11/2007 | Pfaff |
| 7,729,832 B2 | 6/2010 | Benckert et al. |
| 7,845,169 B2 | 12/2010 | Brickner et al. |
| 8,037,682 B2 | 10/2011 | Yi et al. |
| 8,082,083 B2 | 12/2011 | Pirri et al. |
| 8,925,310 B2 | 1/2015 | Pirri et al. |
| 9,810,242 B2 | 11/2017 | Wang |
| 9,933,328 B2 | 4/2018 | Rannow |
| 10,036,407 B2 | 7/2018 | Rannow et al. |
| 10,316,929 B2 | 6/2019 | Wang et al. |
| 10,323,663 B2 * | 6/2019 | Wang ................... F15B 19/005 |
| 10,344,783 B2 | 7/2019 | Wang et al. |
| 10,502,239 B2 | 12/2019 | Wang et al. |
| 10,605,277 B2 | 3/2020 | Wang et al. |
| 10,724,552 B2 | 7/2020 | Rannow et al. |
| 11,028,861 B2 | 6/2021 | Wang |
| 11,047,406 B2 | 6/2021 | Wang et al. |
| 2002/0092417 A1 | 7/2002 | Suzuki et al. |
| 2003/0159576 A1 | 8/2003 | Schoonmaker et al. |
| 2006/0272325 A1 | 12/2006 | Moon |
| 2007/0299589 A1 | 12/2007 | Gianoglio et al. |
| 2008/0034957 A1 | 2/2008 | Stephenson et al. |
| 2008/0087163 A1 | 4/2008 | Brickner et al. |
| 2010/0095835 A1 | 4/2010 | Yuan et al. |
| 2010/0186401 A1 | 7/2010 | Kauss et al. |
| 2011/0088785 A1 | 4/2011 | Balasubramania |
| 2011/0179783 A1 | 7/2011 | Pirri et al. |
| 2012/0198832 A1 | 8/2012 | Fukumoto |
| 2014/0026548 A1 | 1/2014 | Vigholm et al. |
| 2014/0150416 A1 | 6/2014 | Lee |
| 2016/0108936 A1 | 4/2016 | Wang |
| 2016/0222989 A1 | 8/2016 | Rannow et al. |
| 2016/0298660 A1 | 10/2016 | Wang et al. |
| 2016/0298719 A1 | 10/2016 | Wang et al. |
| 2017/0204886 A1 | 7/2017 | Wang et al. |
| 2018/0156243 A1 | 6/2018 | Wang |
| 2019/0101137 A1 | 4/2019 | Rannow et al. |
| 2020/0032820 A1 | 1/2020 | Wang et al. |
| 2020/0124061 A1 | 4/2020 | Yuan |
| 2020/0124062 A1 | 4/2020 | Yuan |
| 2020/0248720 A1 | 8/2020 | Wang et al. |
| 2021/0010490 A1 | 1/2021 | Rannow et al. |

FOREIGN PATENT DOCUMENTS

| | | | |
|---|---|---|---|
| CN | 102705288 A | 10/2012 | |
| DE | 102 53 871 B3 | 8/2004 | |
| DE | 20 2009 007 668 U1 | 10/2009 | |
| EP | 0 457 913 A1 | 11/1991 | |
| EP | 1 134 431 B1 | 5/2005 | |
| EP | 2 347 988 A1 | 7/2011 | |
| EP | 2 503 161 A2 | 9/2012 | |
| JP | H05-163746 A | 6/1993 | |
| JP | 6-147259 A | 5/1994 | |
| JP | 7-113436 A | 5/1995 | |
| JP | 7-300881 A | 11/1995 | |
| JP | 9-041428 A | 2/1997 | |
| JP | 3079498 B2 | 8/2000 | |
| JP | 2003-20197 A | 1/2003 | |
| JP | 2004-301214 A | 10/2004 | |
| JP | 2004-308746 A | 11/2004 | |
| JP | 2006-300280 A | 11/2006 | |
| JP | 2009-74692 A | 4/2009 | |
| JP | 2012-197937 A | 10/2012 | |
| JP | 2013-35527 A | 2/2013 | |
| KR | 10-2003-0088425 A | 11/2003 | |
| KR | 10-1190553 B1 | 10/2012 | |
| WO | 2014/165888 A1 | 10/2014 | |
| WO | 2014/193649 A1 | 12/2014 | |
| WO | 2015/031821 A1 | 3/2015 | |
| WO | 2015/073329 A1 | 5/2015 | |
| WO | 2015/073330 A1 | 5/2015 | |
| WO | 2015/191661 A1 | 12/2015 | |

OTHER PUBLICATIONS

Extended European Search Report for corresponding European Patent Application No. 14840792.7 dated May 9, 2017, 5 pages.
Extended European Search Report for Application No. 14862808.4 dated May 17, 2017.
Extended European Search Report for Application No. 14861695.6 dated Jun. 23, 2017.
Extended European Search Report for corresponding European Patent Application No. 15822402.2 dated Mar. 6, 2018, 8 pages.

(56) References Cited

OTHER PUBLICATIONS

Honma, K. et al., "Vibration Damping Control for Construction Machinery with a Long Arm Manipulator," Journal of the Robotics Society of Japan (JRSJ), vol. 6, No. 5, pp. 99-102 (Oct. 1988).
International Search Report for corresponding International Patent Application No. PCT/US2014/037879 dated Sep. 22, 2014.
International Search Report for corresponding International Patent Application No. PCT/US2014/053523 dated Dec. 3, 2014.
International Search Report for corresponding International Patent Application No. PCT/US2014/064646 dated Mar. 12, 2015.
International Search Report for corresponding International Patent Application No. PCT/US2014/064651 dated Feb. 16, 2015.
International Search Report and Written Opinion of the International Searching Authority for corresponding International Patent Application No. PCT/US2015/040636 dated Oct. 15, 2015, 8 pgs.
Ultronics ZTS16 Control Architecture Overview, Version 1.3, 18 pages (Jul. 2010).
Ultronics ZTS16 User Manual V1.0 (for SW Version 2.3 & OD Version 2.2, 52 pages (Nov. 25, 2009).
Extended European Search Report for Application No. 17891854.5 dated Jan. 14, 2021.
International Search Report and Written Opinion of the International Searching Authority for International Patent Application No. PCT/US2018/029384 dated Aug. 9, 2018, 15 pages.
European Search Report and Written Opinion corresponding to 18792266.1 dated Jan. 14, 2021.
International Search Report and Written Opinion of the International Searching Authority for International Patent Application No. PCT/US2018/029401 dated Jul. 23, 2018, 18 pages.

\* cited by examiner

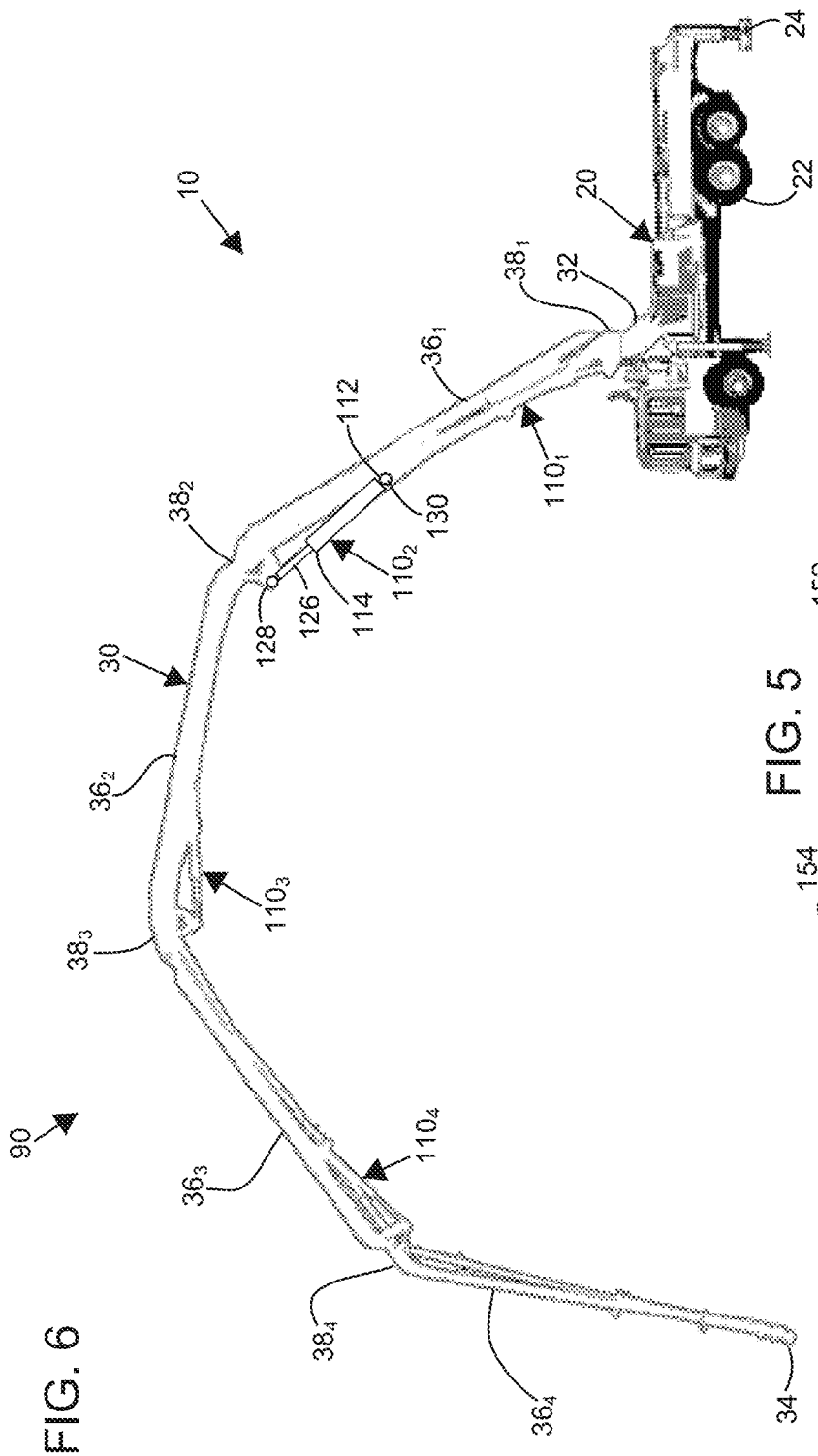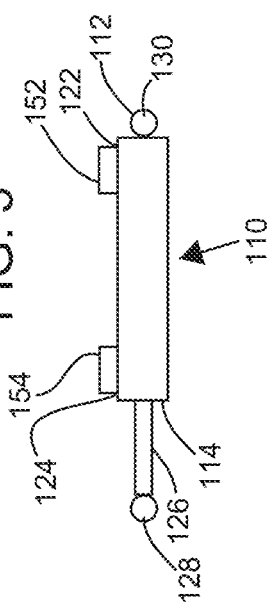

METHODS AND APPARATUS TO ENABLE BOOM BOUNCE REDUCTION AND PREVENT UN-COMMANDED MOTION IN HYDRAULIC SYSTEMS

CROSS-REFERENCE TO RELATED APPLICATIONS

This application is a Continuation of U.S. patent application Ser. No. 15/326,395, filed on Jan. 13, 2017, now U.S. Pat. No. 10,323,663, which is a U.S. National stage Application of PCT/US2015/040636, filed Jul. 15, 2015, which claims benefit of U.S. Patent Application Ser. Nos. 62/024,643 and 62/024,666, both filed on Jul. 15, 2014, the disclosures of which are incorporated herein by reference in their entireties. To the extend appropriate, a claim of priority is made to each of the above disclosed applications.

BACKGROUND

Various off-road and on-road vehicles include booms. For example, certain concrete pump trucks include a boom configured to support a passage through which concrete is pumped from a base of the concrete pump truck to a location at a construction site where the concrete is needed. Such booms may be long and slender to facilitate pumping the concrete a substantial distance away from the concrete pump truck. In addition, such booms may be relatively heavy. The combination of the substantial length and mass properties of the boom may lead to the boom exhibiting undesirable dynamic behavior. In certain booms in certain configurations, a natural frequency of the boom may be about 0.3 Hertz (i.e., 3.3 seconds per cycle). In certain booms in certain configurations, the natural frequency of the boom may be less than about 1 Hertz (i.e., 1 second per cycle). In certain booms in certain configurations, the natural frequency of the boom may range from about 0.1 Hertz to about 1 Hertz (i.e., 10 seconds per cycle to 1 second per cycle). For example, as the boom is moved from place to place, the starting and stopping loads that actuate the boom may induce vibration (i.e., oscillation). Other load sources that may excite the boom include momentum of the concrete as it is pumped along the boom, starting and stopping the pumping of concrete along the boom, wind loads that may develop against the boom, and/or other miscellaneous loads. Certain concrete pumps may include a pulse-like pumping profile with a pulse frequency of about 1 Hertz. A velocity profile (i.e., a volumetric rate profile) of concrete at an outlet of such concrete pumps may fluctuate significantly over each period of the profile. The varying velocity profile corresponds with a varying acceleration profile and may result in significant inertial loads being imposed on the boom.

Other vehicles with booms include fire trucks in which a ladder may be included on the boom, fire trucks which include a boom with plumbing to deliver water to a desired location, excavators which use a boom to move a shovel, tele-handlers which use a boom to deliver materials around a construction site, cranes which may use a boom to move material from place-to-place, etc.

In certain boom applications, including those mentioned above, a hydraulic cylinder may be used to actuate the boom. By actuating the hydraulic cylinder, the boom may be deployed and retracted, as desired, to achieve a desired placement of the boom. In certain applications, counter-balance valves may be used to control actuation of the hydraulic cylinder and/or to prevent the hydraulic cylinder from un-commanded movement (e.g., caused by a component failure). A prior art system 100, including a first counter-balance valve 300 and a second counter-balance valve 400 is illustrated at FIG. 1. The counter-balance valve 300 controls and/or transfers hydraulic fluid flow into and out of a first chamber 116 of a hydraulic cylinder 110 of the system 100. Likewise, the second counter-balance valve 400 controls and/or transfers hydraulic fluid flow into and out of a second chamber 118 of the hydraulic cylinder 110. In particular, a port 302 of the counter-balance valve 300 is connected to a port 122 of the hydraulic cylinder 110. Likewise, a port 402 of the counter-balance valve 400 is fluidly connected to a port 124 of the hydraulic cylinder 110. As depicted, a fluid line 522 schematically connects the port 302 to the port 122, and a fluid line 524 connects the port 402 to the port 124. The counter-balance valves 300, 400 are typically mounted directly to the hydraulic cylinder 110. The port 302 may directly connect to the port 122, and the port 402 may directly connect to the port 124.

The counter-balance valves 300, 400 provide safety protection to the system 100. In particular, before movement of the cylinder 110 can occur, hydraulic pressure must be applied to both of the counter-balance valves 300, 400. The hydraulic pressure applied to one of the counter-balance valves 300, 400 is delivered to a corresponding one of the ports 122, 124 of the hydraulic cylinder 110 thereby urging a piston 120 of the hydraulic cylinder 110 to move. The hydraulic pressure applied to an opposite one of the counter-balance valves 400, 300 allows hydraulic fluid to flow out of the opposite port 124, 122 of the hydraulic cylinder 110. By requiring hydraulic pressure at the counter-balance valve 300, 400 corresponding to the port 122, 124 that is releasing the hydraulic fluid, a failure of a hydraulic line, a valve, a pump, etc. that supplies or receives the hydraulic fluid from the hydraulic cylinder 110 will not result in un-commanded movement of the hydraulic cylinder 110.

Turning now to FIG. 1, the system 100 will be described in detail. As depicted, a four-way three position hydraulic control valve 200 is used to control the hydraulic cylinder 110. The control valve 200 includes a spool 220 that may be positioned at a first configuration 222, a second configuration 224, or a third configuration 226. As depicted at FIG. 1, the spool 220 is at the first configuration 222. In the first configuration 222, hydraulic fluid from a supply line 502 is transferred from a port 212 of the control valve 200 to a port 202 of the control valve 200 and ultimately to the port 122 and the chamber 116 of the hydraulic cylinder 110. The hydraulic cylinder 110 is thereby urged to extend and hydraulic fluid in the chamber 118 of the hydraulic cylinder 110 is urged out of the port 124 of the cylinder 110. Hydraulic fluid leaving the port 124 returns to a hydraulic tank by entering a port 204 of the control valve 200 and exiting a port 214 of the control valve 200 into a return line 504. In certain embodiments, the supply line 502 supplies hydraulic fluid at a constant or at a near constant supply pressure. In certain embodiments, the return line 504 receives hydraulic fluid at a constant or at a near constant return pressure.

When the spool 220 is positioned at the second configuration 224, hydraulic fluid flow between the port 202 and the ports 212, 214 and hydraulic fluid flow between the port 204 and the ports 212, 214 are effectively stopped, and hydraulic fluid flow to and from the cylinder 110 is effectively stopped. Thus, the hydraulic cylinder 110 remains substantially stationary when the spool 220 is positioned at the second configuration 224.

When the spool 220 is positioned at the third configuration 226, hydraulic fluid flow from the supply line 502 enters through the port 212 and exits through the port 204 of the valve 200. The hydraulic fluid flow is ultimately delivered to the port 124 and the chamber 118 of the hydraulic cylinder 110 thereby urging retraction of the cylinder 110. As hydraulic fluid pressure is applied to the chamber 118, hydraulic fluid within the chamber 116 is urged to exit through the port 122. Hydraulic fluid exiting the port 122 enters the port 202 and exits the port 214 of the valve 200 and thereby returns to the hydraulic tank. An operator and/or a control system may move the spool 220 as desired and thereby achieve extension, retraction, and/or locking of the hydraulic cylinder 110.

A function of the counter-balance valves 300, 400 when the hydraulic cylinder 110 is extending will now be discussed in detail. Upon the spool 220 of the valve 200 being placed in the first configuration 222, hydraulic fluid pressure from the supply line 502 pressurizes a hydraulic line 512. The hydraulic line 512 is connected between the port 202 of the control valve 200, a port 304 of the counter-balance valve 300, and a port 406 of the counter-balance valve 400. Hydraulic fluid pressure applied at the port 304 of the counter-balance valve 300 flows past a spool 310 of the counter-balance valve 300 and past a check valve 320 of the counter-balance valve 300 and thereby flows from the port 304 to the port 302 through a passage 322 of the counter-balance valve 300. The hydraulic fluid pressure further flows through the port 122 and into the chamber 116 (i.e., a meter-in chamber). Pressure applied to the port 406 of the counter-balance valve 400 moves a spool 410 of the counter-balance valve 400 against a spring 412 and thereby compresses the spring 412. Hydraulic fluid pressure applied at the port 406 thereby opens a passage 424 between the port 402 and the port 404. By applying hydraulic pressure at the port 406 (i.e., a pilot), hydraulic fluid may exit the chamber 118 (i.e., a meter-out chamber) through the port 124, through the line 524, through the passage 424 of the counter-balance valve 400 across the spool 410, through a hydraulic line 514, through the valve 200, and through the return line 504 into the tank. The meter-out side may supply backpressure.

A function of the counter-balance valves 300, 400 when the hydraulic cylinder 110 is retracting will now be discussed in detail. Upon the spool 220 of the valve 200 being placed in the third configuration 226, hydraulic fluid pressure from the supply line 502 pressurizes the hydraulic line 514. The hydraulic line 514 is connected between the port 204 of the control valve 200, a port 404 of the counter-balance valve 400, and a port 306 of the counter-balance valve 300. Hydraulic fluid pressure applied at the port 404 of the counter-balance valve 400 flows past the spool 410 of the counter-balance valve 400 and past a check valve 420 of the counter-balance valve 400 and thereby flows from the port 404 to the port 402 through a passage 422 of the counter-balance valve 400. The hydraulic fluid pressure further flows through the port 124 and into the chamber 118 (i.e., a meter-in chamber). Hydraulic pressure applied to the port 306 of the counter-balance valve 300 moves the spool 310 of the counter-balance valve 300 against a spring 312 and thereby compresses the spring 312. Hydraulic fluid pressure applied at the port 306 thereby opens a passage 324 between the port 302 and the port 304. By applying hydraulic pressure at the port 306 (i.e., a pilot), hydraulic fluid may exit the chamber 116 (i.e., a meter-out chamber) through the port 122, through the line 522, through the passage 324 of the counter-balance valve 300 across the spool 310, through the hydraulic line 512, through the valve 200, and through the return line 504 into the tank. The meter-out side may supply backpressure.

The supply line 502, the return line 504, the hydraulic line 512, the hydraulic line 514, the hydraulic line 522, and/or the hydraulic line 524 may belong to a line set 500.

Conventional solutions for reducing the above mentioned oscillations are typically passive (i.e., orifices) which are tuned for one particular operating point and often have a negative impact on efficiency. Many machines/vehicles with extended booms employ counter-balance valves (CBVs) such as counter-balance valves 300, 400 for safety and safety regulation reasons. These counter-balance valves (CBVs) restrict/block the ability of the hydraulic control valve (e.g., the hydraulic control valve 200) to sense and act upon pressure oscillations. In certain applications, such as concrete pump truck booms, oscillations are induced by external sources (e.g., the pumping of the concrete) when the machine (e.g., the boom) is nominally stationary. In this case, the counter-balance valves (CBVs) are closed, and the main control valve (e.g., the hydraulic control valve 200) is isolated from the oscillating pressure that is induced by the oscillations. There are a number of conventional solutions that approach this problem, that typically rely on joint position sensors to sense the oscillations (i.e., ripples) and prevent drift due to flow through a ripple-cancelling valve. Some solutions also have parallel hydraulic systems that allow a ripple-cancelling valve to operate while the counter-balance valves (CBVs) are in place.

SUMMARY

One aspect of the present disclosure relates to systems and methods for reducing boom dynamics (e.g., boom bounce) of a boom while providing counter-balance valve protection to the boom.

Another aspect of the present disclosure relates to systems and methods for detecting faults in hydraulic actuation systems with counter-balance valves, preventing any single-point fault from causing a boom falling event, and/or mitigating the faults.

Still another aspect of the present disclosure relates to systems and methods for using independent metering control valves to achieve boom motion control and boom vibration (e.g., boom bounce) reduction simultaneously. In certain embodiments, a main load carrying chamber of a hydraulic actuator may carry steady-state or quasi-steady-state loads, while an opposite chamber may be supplied with a dynamic pressure and/or flow rate of hydraulic fluid to manage and/or control the boom vibration. The dynamic pressure and/or the flow rate of the hydraulic fluid may be supplied to the opposite chamber with a goal of stabilizing a pressure and/or a flow rate of the main load carrying chamber of the hydraulic actuator (e.g., at a DC level).

Still another aspect of the present disclosure relates to a method of controlling a hydraulic actuator that is hydraulically coupled to a pair of counter-balance valves. The method includes: A) providing the hydraulic actuator with a pair of chambers that are hydraulically coupled to the pair of counter-balance valves, respectively; B) providing a pair of control valves that are hydraulically coupled to the pair of counter-balance valves; C) operating a first control valve of the pair of control valves in a pressure control mode; D) operating a second control valve of the pair of control valves in a flow control mode; and E) transferring hydraulic fluid flow with the pair of control valves to/from the hydraulic actuator via the pair of counter-balance valves.

In certain embodiments, the method may include: F) pressurizing a second pilot of a second counter-balance valve of the pair of counter-balance valves with the first control valve and thereby opening the second counter-balance valve; and/or G) pressurizing a first pilot of a first counter-balance valve of the pair of counter-balance valves with the second control valve and thereby opening the first counter-balance valve.

Still another aspect of the present disclosure relates to a method of controlling a hydraulic actuator that is hydraulically coupled to a pair of counter-balance valves. The method includes: A) providing the hydraulic actuator; B) providing a pair of control valves that are hydraulically coupled to the pair of counter-balance valves; C) pressurizing a pilot of both of the counter-balance valves with the pair of control valves, respectively, and thereby opening both of the counter-balance valves; and D) transferring hydraulic fluid flow with the pair of control valves to/from the hydraulic actuator via the pair of counter-balance valves. The hydraulic actuator includes a pair of chambers that are hydraulically coupled to the pair of counter-balance valves, respectively. The pressurizing of the pilots of both of the counter-balance valves opens both of the counter-balance valves. A disturbance load at the hydraulic actuator may be sensed with at least one pressure sensor at the pair of control valves. A disturbance response component (i.e., a transitional, an oscillating, and/or an AC component), at least partially counteracting the disturbance load, may be transferred with the hydraulic fluid flow. A kinematic component (i.e., a steady-state, a quasi-steady-state, and/or a DC component), driving one or more configuration loads at the hydraulic actuator, may be transferred with the hydraulic fluid flow.

Yet another aspect of the present disclosure relates to a method of controlling a hydraulic actuator that includes a meter-in chamber and a meter-out chamber. The method includes: A) providing the hydraulic actuator; B) providing a meter-in counter-balance valve that is fluidly connected to the meter-in chamber at a first node; C) providing a meter-out counter-balance valve that is fluidly connected to the meter-out chamber at a second node; D) providing a meter-in control valve that is fluidly connected to the meter-in counter-balance valve at a third node; E) providing a meter-out control valve that is fluidly connected to the meter-out counter-balance valve at a fourth node; F) opening the meter-out counter-balance valve by applying at least an opening pressure at a pilot of the meter-out counter-balance valve with the meter-in control valve; and G) operating the meter-out control valve in a flow control mode. In certain configurations, the meter-in chamber is a rod chamber, and the meter-out chamber is a head chamber. In other configurations, the meter-in chamber is a head chamber and the meter-out chamber is a rod chamber. In certain configurations, the meter-in chamber is a loaded chamber, and the meter-out chamber is an unloaded chamber. In other configurations, the meter-in chamber is an unloaded chamber and the meter-out chamber is a loaded chamber. These configurations may alternate, from time-to-time, within the same apparatus.

Still another aspect of the present disclosure relates to testing for a fault condition of the second control valve, and indicating a valve fault if the fault condition is present.

In certain embodiments, the method may include regulating an output pressure from the first control valve, if the valve fault is indicated and if a lower-override command is indicated; regulating a pilot pressure that is pressurizing the second pilot of the second counter-balance valve by the regulating of the output pressure from the first control valve; and throttling the second counter-balance valve by the regulating of the pilot pressure and thereby lowering an apparatus actuated by the hydraulic actuator.

Still another aspect of the present disclosure relates to a method of controlling a hydraulic actuator that is hydraulically coupled to a pair of counter-balance valves. The method includes regulating at least a lowest value of output pressure from a first control valve to be high enough so that enough pilot pressure can be applied to an opposite counter-balance valve, and flow can go from an opposite actuator chamber to a second control valve and further to a tank.

In certain embodiments, the method may include closing the second counter-balance valve by depressurizing the second pilot of the second counter-balance valve with the first control valve, if the valve fault is indicated, and thereby stopping motion of the hydraulic actuator. The testing for the fault condition of the second control valve may include monitoring a position of a spool of the second control valve and comparing the position of the spool with a spool position command transmitted by a controller to the second control valve. The indicating of the valve fault may occur if the position of the spool does not correspond with the spool position command.

In certain embodiments, the testing may include monitoring a hydraulic flow through the second control valve and comparing the hydraulic flow with a reference flow command transmitted by a controller to the second control valve. The indicating of the valve fault may occur if the hydraulic flow through the second control valve does not correspond with the reference flow command.

In certain embodiments, the testing may include imposing an upper limit for output flow from the first control valve; reducing an output pressure from the first control valve as the upper limit for the output flow from the first control valve is approached; and automatically reducing a pilot pressure that is pressurizing the second pilot of the second counter-balance valve and thereby closing the second counter-balance valve and thereby stopping motion of the hydraulic actuator when the pilot pressure is sufficiently reduced.

In certain embodiments, the testing may include monitoring a first hydraulic flow through the first control valve; monitoring a second hydraulic flow through the second control valve; testing for a fault condition of a hydraulic line between the second counter-balance valve and the second control valve; and indicating a hydraulic line fault if the fault condition is present.

In certain embodiments, the testing may include operating at least a corresponding one of the control valves in the flow control mode, commanding a test amount of flow to tank through the corresponding one of the control valves with the hydraulic actuator stationary, and monitoring a pressure from the corresponding one of the control valves when the test amount flows to the tank. The indicating of the valve fault may occur if the pressure is not sufficiently reduced when the test amount flows to the tank.

Yet another aspect of the present disclosure relates to a valve arrangement for use with a hydraulic actuator that includes a first chamber and a second chamber. The valve arrangement includes a first counter-balance valve, a second counter-balance valve, a first control valve, a second control valve, and a normal operating mode. The first counter-balance valve is fluidly connected to the first chamber at a first node. The second counter-balance valve is fluidly connected to the second chamber at a second node. The first control valve is fluidly connected to the first counter-balance valve at a third node. The second control valve is fluidly connected to the second counter-balance valve at a fourth node. In the normal operating mode, the second counter-balance valve is opened by the first control valve supplying a pressure to a pilot of the second counter-balance valve. The second control valve regulates an actuation velocity of the hydraulic actuator.

In certain embodiments, the valve arrangement further includes an override mode where the second counter-balance valve is opened by the first control valve supplying a pressure to a pilot of the second counter-balance valve. The second counter-balance valve may regulate actuation of the hydraulic actuator. The override mode may be used to lower a boom when a fault is present.

In certain embodiments, the valve arrangement further includes a first valve that is fluidly connected to the first pilot of the first counter-balance valve at a fifth node and is fluidly connected to the second counter-balance valve and the second control valve at the fourth node. A second valve may be fluidly connected to the second pilot of the second counter-balance valve at a sixth node and be fluidly connected to the first counter-balance valve and the first control valve at the third node.

Yet another aspect of the present disclosure relates to a valve arrangement for use with a hydraulic actuator that includes a first chamber and a second chamber. The valve arrangement includes a first counter-balance valve, a second counter-balance valve, a first control valve, a second control valve, a first operating mode, and a second operating mode. The first counter-balance valve is fluidly connected to the first chamber at a first node. The second counter-balance valve is fluidly connected to the second chamber at a second node. The first control valve is fluidly connected to the first counter-balance valve at a third node. The second control valve is fluidly connected to the second counter-balance valve at a fourth node. In the first operating mode, the second counter-balance valve is opened by the first control valve supplying a first pressure to a second pilot of the second counter-balance valve, and the first counter-balance valve is opened by the second control valve supplying a second pressure to a first pilot of the first counter-balance valve. In the second operating mode, at least one of the counter-balance valves is closed.

Still another aspect of the present disclosure relates to a method of controlling a hydraulic actuator that is hydraulically coupled to a pair of counter-balance valves. The method includes regulating a reference pressure (i.e., steady-state or quasi-steady-state, and/or DC pressure) for a load carrying chamber pressure to be at least high enough to provide enough pilot pressure to a first counter-balance valve, so that flow can enter and exit an opposite chamber of the hydraulic actuator. A three-way valve that is connected to the meter-out chamber (ZTS2) operates in a flow control mode to regulate an actuator speed to a desired value.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 5 is a schematic illustration of a hydraulic cylinder suitable for use with the hydraulic cylinder control system of FIG. 2 according to the principles of the present disclosure; and FIG. 6 is a schematic illustration of a vehicle with a boom system that is actuated by one or more cylinders and controlled with the hydraulic system of FIG. 2 according to the principles of the present disclosure.

DETAILED DESCRIPTION

Figure 1:
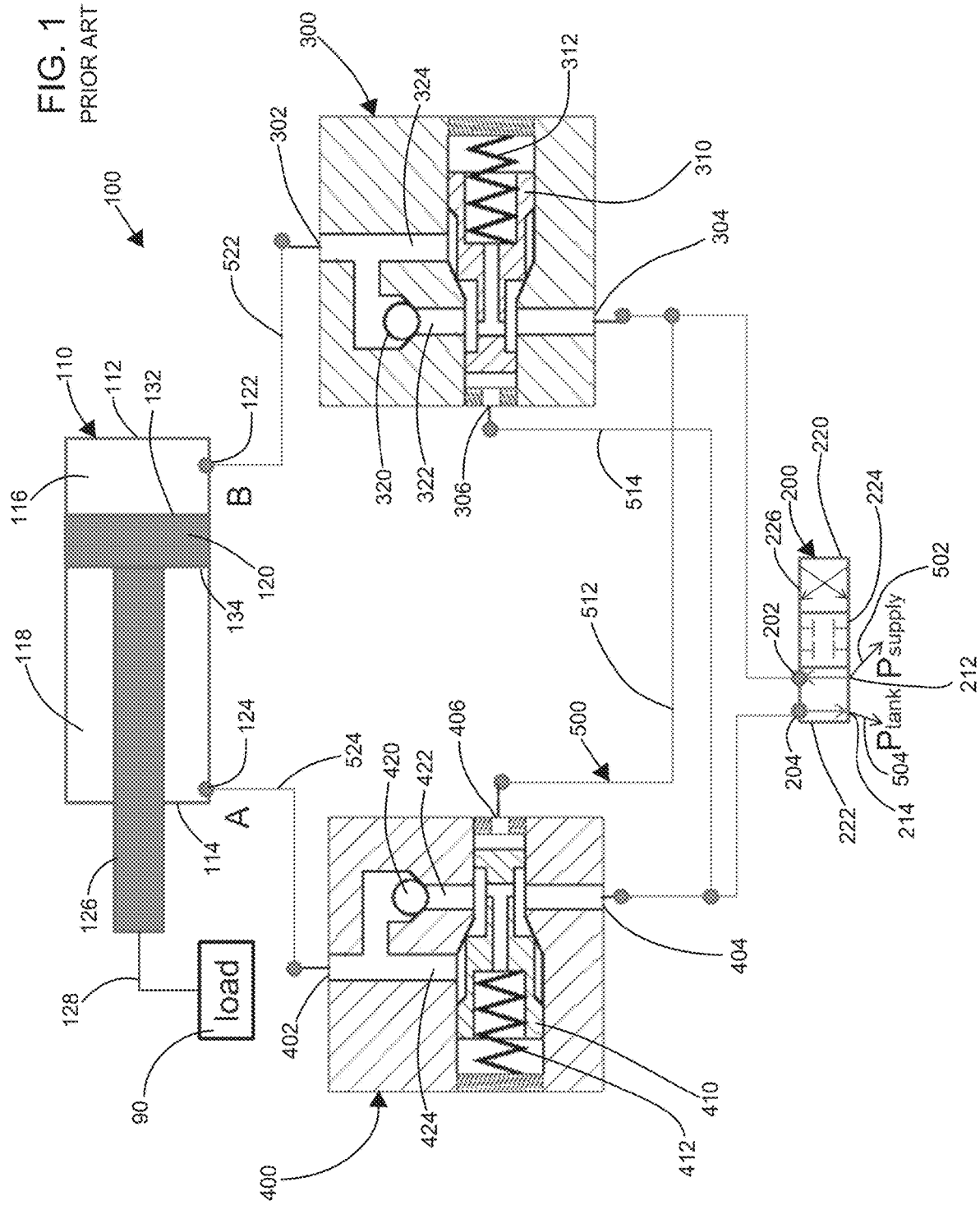
FIG. 1 is a schematic illustration of a prior art hydraulic system including a hydraulic cylinder with a pair of counter-balance valves and a control valve.
Figure 2:
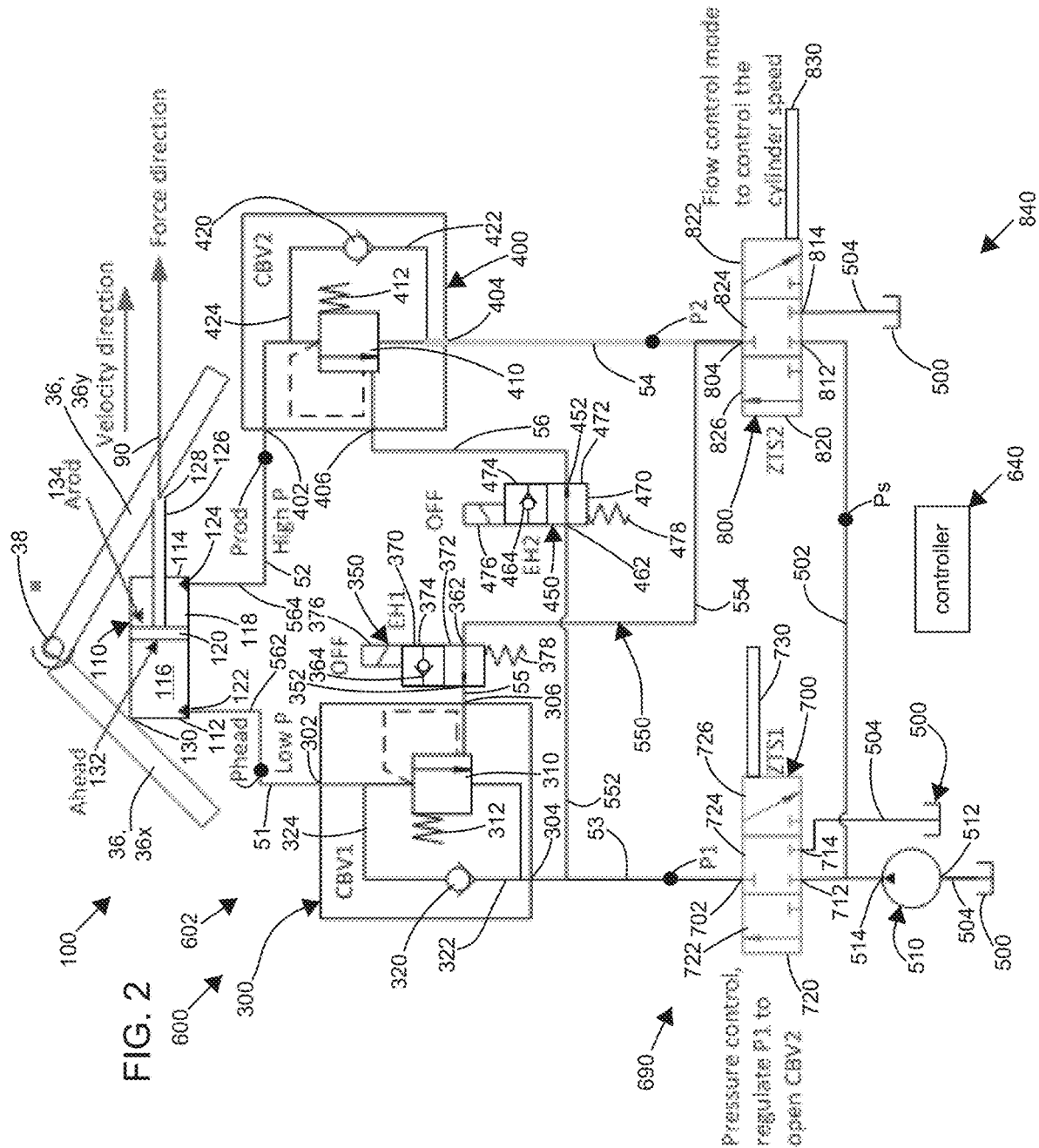
FIG. 2 is a schematic illustration of a hydraulic system including the hydraulic cylinder and the counter-balance valves of FIG. 1 configured with a hydraulic cylinder control system according to the principles of the present disclosure.

According to the principles of the present disclosure, a hydraulic system is adapted to actuate the hydraulic cylinder 110, including the counter-balance valves 300 and 400, and may further provide means for counteracting vibrations to which the hydraulic cylinder 110 is exposed. As illustrated at FIG. 2, an example system 600 is illustrated with the hydraulic cylinder 110 (i.e., a hydraulic actuator), the counter-balance valve 300, and the counter-balance valve 400. The hydraulic cylinder 110 and the counter-balance valves 300, 400 of FIG. 2 may be the same as those shown in the prior art system 100 of FIG. 1. The hydraulic system 600 may therefore be retrofitted to an existing and/or a conventional hydraulic system. The depicted embodiment illustrated at FIG. 2 can represent the prior art hydraulic system 100 of FIG. 1 retrofitted by replacing the hydraulic control valve 200 with a valve assembly 690, described in detail below, and by adding valves 350 and/or 450. Certain features of the hydraulic cylinder 110 and the counter-balance valves 300, 400 may be the same or similar between the hydraulic system 600 and the prior art hydraulic system 100. These same or similar components and/or features will not, in general, be redundantly re-described herein.

It will be understood that certain concepts and principles disclosed herein apply to both linear and rotary actuators. The hydraulic cylinder 110, illustrated in the Figures, is an example actuator. The hydraulic cylinder 110 is an example hydraulic cylinder and an example linear actuator. In certain applications, the hydraulic cylinder 110 may be replaced with a rotary actuator. The rotary actuator may operate over a range of less than 360 degrees, a range of 360 degrees, a range of more than 360 degrees, or may have an unlimited range in one or both rotational directions.

The example system 600 is an example of a system with electro-hydraulically controlled actuators. Such electro-hydraulically controlled actuators may include a variety of electronic components that sense, actuate, and/or provide various logical functionality for the system. Such electro-hydraulically controlled actuators typically include a controller 640 that receives and processes sensor information, performs logical and/or other calculations, and/or returns control signals to actuate various components of the system. Such electro-hydraulically controlled actuators provide benefits in the form of a better realization of a state of the system, added intelligence for dealing with various internal and external variables, finer control and precision, a reduction in weight, and/or an increase in efficiency. However, certain electro-hydraulic components may not be as reliable as mechanical-only counterparts. According to the principles of the present disclosure, electro-hydraulically controlled actuator systems may harness their greater intelligence and logic potential to offset real and/or perceived reliability deficiencies when compared to mechanical-only systems. In addition, according to the principles of the present disclosure, the electro-hydraulically controlled actuators may harness their intelligence and logic capabilities to mitigate any faults that may occur.

In particular, the system 600 is arranged and configured to eliminate all single point failures from resulting in a boom falling condition. In addition, the example system 600 provides an ability to lower a boom 30 (see FIG. 4) with a system fault present. In certain embodiments, an operator is alerted to any failures that are detected. The operator may further be given a manual override control that may be used to further operate the system 600 in the presence of a fault. By operating the system 600 in the presence of a fault, the operator may return a component to a home position before maintenance on the fault is performed. In particular, the boom 30 may be lowered to the ground in the presence of certain faults before maintenance is performed to correct the faults.

Additional details will be provided on the various faults, provisions that prevent single point faults from resulting in the boom falling condition, and various mitigation strategies. But first, additional details of the example system 600 will be provided.

According to the principles of the present disclosure, similar protection is provided by the counter-balance valves 300, 400 for the hydraulic cylinder 110 and the hydraulic system 600, as described above with respect to the hydraulic system 100. In particular, failure of a hydraulic line, a hydraulic valve, and/or a hydraulic pump will not lead to an un-commanded movement of the hydraulic cylinder 110 of the hydraulic system 600. The hydraulic architecture of the hydraulic system 600 may further provide the ability to counteract vibrations using the hydraulic cylinder 110.

The hydraulic cylinder 110 may hold a net load 90 that, in general, may urge retraction or extension of a rod 126 of the cylinder 110. The rod 126 is connected to the piston 120 of the cylinder 110. If the load 90 urges extension of the hydraulic cylinder 110, the chamber 118 on a rod side 114 of the hydraulic cylinder 110 is pressurized by the load 90, and the counter-balance valve 400 acts to prevent the release of hydraulic fluid from the chamber 118 and thereby acts as a safety device to prevent un-commanded extension of the hydraulic cylinder 110. In other words, the counter-balance valve 400 locks the chamber 118. In addition to providing safety, the locking of the chamber 118 prevents drifting of the cylinder 110.

If the load 90 urges retraction of the hydraulic cylinder 110, the chamber 116 on the head side 112 of the hydraulic cylinder 110 is pressurized by the load 90, and the counter-balance valve 300 acts to prevent the release of hydraulic fluid from the chamber 116 and thereby acts as a safety device to prevent un-commanded retraction of the hydraulic cylinder 110. In other words, the counter-balance valve 300 locks the chamber 116. In addition to providing safety, the locking of the chamber 116 prevents drifting of the cylinder 110.

The load 90 is depicted as attached via a rod connection 128 to the rod 126 of the cylinder 110. In certain embodiments, the load 90 is a tensile or a compressive load across the rod connection 128 and the head side 112 of the cylinder 110.

Use of the system 600 may be implemented while assuring protection from failures of certain hydraulic lines, hydraulic valves, and/or hydraulic pumps, as described above. The protection from failure may be automatic and/or mechanical. In certain embodiments, the protection from failure may not require any electrical signal and/or electrical power to engage. The protection from failure may be and/or meet a regulatory requirement (e.g., an ISO standard). The regulatory requirement may require certain mechanical means of protection that is provided by the hydraulic system 600.

Hydraulic fluid flow to the chamber 116 of the head side 112 of the cylinder 110, and hydraulic fluid flow to the chamber 118 of the rod side 114 of the cylinder 110 are independently controlled and/or metered. According to the principles of the present disclosure, the hydraulic system 600 may be configured similar to a conventional counter-balance system (e.g., the hydraulic system 100).

As further described below, the hydraulic system 600 may enable measurement of pressures within the chambers 116 and/or 118 of the cylinder 110 at a remote location away from the hydraulic cylinder 110 (e.g., at sensors P1, P2). This architecture thereby may reduce mass that would otherwise be positioned on the boom and/or may simplify routing of hydraulic lines (e.g., hard tubing and hoses). Performance of machines such as concrete pump booms and/or lift handlers may be improved by such simplified hydraulic line routing and/or reduced mass on the boom. In certain embodiments, the hydraulic system 600 may enable measurement of the pressures within the chambers 116 and/or 118 of the cylinder 110 at the hydraulic cylinder 110 (e.g., at sensors Phead and/or Prod). In the embodiment depicted at FIG. 2, the sensor Phead may measure the pressure within the chamber 116, and the sensor Prod may measure the pressure within the chamber 118. Signals from some or all of the sensors P1, P2, Phead, Prod, etc. may be sent to a controller 640 (e.g., for use as feedback signals).

The counter-balance valves 300 and 400 may be components of a valve arrangement 840 (i.e., a valve set). The valve arrangement 840 may include various hydraulic components that control and/or regulate hydraulic fluid flow to and/or from the hydraulic cylinder 110. The valve arrangement 840 may further include a control valve 700 (e.g., a proportional hydraulic valve), a control valve 800 (e.g., a proportional hydraulic valve), the valve 350 (e.g., a 2-way valve), and the valve 450 (e.g., a 2-way valve). The control valves 700 and/or 800 may be high bandwidth and/or high resolution control valves.

In the depicted embodiment of FIG. 2, a node 51 is defined at the port 302 of the counter-balance valve 300 and the port 122 of the hydraulic cylinder 110; a node 52 is defined at the port 402 of the counter-balance valve 400 and the port 124 of the hydraulic cylinder 110; a node 53 is defined at the port 304 of the counter-balance valve 300, a port 462 of the valve 450, and the port 702 of the hydraulic valve 700; a node 54 is defined at the port 404 of the counter-balance valve 400, a port 362 of the valve 350, and the port 804 of the hydraulic valve 800; a node 55 is defined at the port 306 of the counter-balance valve 300 and a port 352 of the valve 350; and a node 56 is defined at the port 406 of the counter-balance valve 400 and a port 452 of the valve 450. The hydraulic valves 350 and 450 are described in detail below.

As is further described below, the system 600 provides a control framework and a control mechanism to achieve boom vibration reduction for both off-highway vehicles and on-highway vehicles. The boom vibration reduction may occur while the hydraulic cylinder is in motion (e.g., while the boom is being placed at a worksite). The vibration reduction may be adapted to reduced vibrations in booms with relatively low natural frequencies (e.g., the concrete pump truck boom). The hydraulic system 600 may also be applied to booms with relatively high natural frequencies (e.g., an excavator boom). Compared with conventional solutions, the hydraulic system 600 may achieve vibration reduction of booms with fewer sensors and a simplified control structure. The vibration reduction method may be implemented while assuring protection from failures of certain hydraulic lines, hydraulic valves, and/or hydraulic pumps, as described above. The protection from failure may be automatic and/or mechanical. In certain embodiments, the protection from failure may not require any electrical signal and/or electrical power to engage. The protection from failure may be and/or meet a regulatory requirement (e.g., an ISO standard). The regulatory requirement may require certain mechanical means of protection that is provided by the hydraulic system 600.

Certain booms may include stiffness and inertial properties that can transmit and/or amplify dynamic behavior of the load 90. As the dynamic load 90 may include external force/position disturbances that are applied to the boom, severe vibrations (i.e., oscillations) may result, especially when these disturbances are near the natural frequency of the boom. Such excitation of the boom by the load 90 may result in safety issues and/or decrease productivity and/or reliability of the boom system. By measuring parameters of the hydraulic system 600 and responding appropriately, effects of the disturbances may be reduced and/or minimized or even eliminated. The response provided may be effective over a wide variety of operating conditions.

According to the principles of the present disclosure, hydraulic fluid flow to the chamber 116 of the head side 112 of the cylinder 110, and hydraulic fluid flow to the chamber 118 of the rod side 114 of the cylinder 110 are independently controlled and/or metered. According to the principles of the present disclosure, the hydraulic system 600 may be configured similar to a conventional counter-balance system (e.g., the hydraulic system 100).

As further described below, the hydraulic system 600 may enable measurement of pressures within the chambers 116 and/or 118 of the cylinder 110 at a remote location away from the hydraulic cylinder 110 (e.g., at sensors P1, P2). This architecture thereby may reduce mass that would otherwise be positioned on the boom and/or may simplify routing of hydraulic lines (e.g., hard tubing and hoses). Performance of machines such as concrete pump booms and/or lift handlers may be improved by such simplified hydraulic line routing and/or reduced mass on the boom. In certain embodiments, the hydraulic system 600 may enable measurement of the pressures within the chambers 116 and/or 118 of the cylinder 110 at the hydraulic cylinder 110 (e.g., at sensors Phead and/or Prod). In the embodiment depicted at FIG. 2, the sensor Phead may measure the pressure within the chamber 116, and the sensor Prod may measure the pressure within the chamber 118. Signals from some or all of the sensors P1, P2, Phead, Prod, etc. may be sent to a controller 640 (e.g., for use as feedback signals).

The counter-balance valves 300 and 400 may be components of a valve arrangement 840 (i.e., a valve set). The valve arrangement 840 may include various hydraulic components that control and/or regulate hydraulic fluid flow to and/or from the hydraulic cylinder 110. The valve arrangement 840 may further include a control valve 700 (e.g., a proportional hydraulic valve), a control valve 800 (e.g., a proportional hydraulic valve), the valve 350 (e.g., a 2-way valve), and the valve 450 (e.g., a 2-way valve). The control valves 700 and/or 800 may be high bandwidth and/or high resolution control valves.

In the depicted embodiment of FIG. 2, a node 51 is defined at the port 302 of the counter-balance valve 300 and the port 122 of the hydraulic cylinder 110; a node 52 is defined at the port 402 of the counter-balance valve 400 and the port 124 of the hydraulic cylinder 110; a node 53 is defined at the port 304 of the counter-balance valve 300, a port 462 of the valve 450, and the port 702 of the hydraulic valve 700; a node 54 is defined at the port 404 of the counter-balance valve 400, a port 362 of the valve 350, and the port 804 of the hydraulic valve 800; a node 55 is defined at the port 306 of the counter-balance valve 300 and a port 352 of the valve 350; and a node 56 is defined at the port 406 of the counter-balance valve 400 and a port 452 of the valve 450. The hydraulic valves 350 and 450 are described in detail below.

Turning now to FIG. 5, the hydraulic cylinder 110 is illustrated with valve blocks 152, 154. The valve blocks 152, 154 may be separate from each other, as illustrated, or may be a single combined valve block. The valve block 152 may be mounted to and/or over the port 122 of the hydraulic cylinder 110, and the valve block 154 may be mounted to and/or over the port 124 of the hydraulic cylinder 110. The valve blocks 152, 154 may be directly mounted to the hydraulic cylinder 110. The valve block 152 may include the counter-balance valve 300 and/or the valve 350, and the valve block 154 may include the counter-balance valve 400 and/or the valve 450. The valve blocks 152 and/or 154 may include additional components of the valve arrangement 840. The valve blocks 152, 154, and/or the single combined valve block may include sensors and/or sensor ports (e.g., pressure and/or flow sensors and/or corresponding ports).

Turning now to FIG. 6, an example boom system 10 is described and illustrated in detail. The boom system 10 may include a vehicle 20 and a boom 30. The vehicle 20 may include a drive train 22 (e.g., including wheels and/or tracks). As depicted at FIG. 6, rigid retractable supports 24 are further provided on the vehicle 20. The rigid supports 24 may include feet that are extended to contact the ground and thereby support and/or stabilize the vehicle 20 by bypassing ground support away from the drive train 22 and/or suspension of the vehicle 20. In other vehicles (e.g., vehicles with tracks, vehicles with no suspension), the drive train 22 may be sufficiently rigid and retractable rigid supports 24 may not be needed and/or provided.

As depicted at FIG. 6, the boom 30 extends from a first end 32 to a second end 34. As depicted, the first end 32 is rotatably attached (e.g., by a turntable) to the vehicle 20. The second end 34 may be positioned by actuation of the boom 30 and thereby be positioned as desired. In certain applications, it may be desired to extend the second end 34 a substantial distance away from the vehicle 20 in a primarily horizontal direction. In other embodiments, it may be desired to position the second end 34 vertically above the vehicle 20 a substantial distance. In still other applications, the second end 34 of the boom 30 may be spaced both vertically and horizontally from the vehicle 20. In certain applications, the second end 34 of the boom 30 may be lowered into a hole and thereby be positioned at an elevation below the vehicle 20.

As depicted, the boom 30 includes a plurality of boom segments 36. Adjacent pairs of the boom segments 36 may be connected to each other by a corresponding joint 38. As depicted, a first boom segment $36_1$ is rotatably attached to the vehicle 20 at a first joint $38_1$. The first boom segment $36_1$ may be mounted by two rotatable joints. For example, the first rotatable joint may include a turntable, and the second rotatable joint may include a horizontal axis. A second boom segment $36_2$ is attached to the first boom segment $36_1$ at a second joint $38_2$. Likewise, a third boom segment $36_3$ is attached to the second boom segment $36_2$ at a joint $38_3$, and a fourth boom segment $36_4$ is attached to the third boom segment $36_3$ at a fourth joint $38_4$. A relative position/orientation between the adjacent pairs of the boom segments 36 may be controlled by a corresponding hydraulic cylinder 110. For example, a relative position/orientation between the first boom segment $36_1$ and the vehicle 20 is controlled by a first hydraulic cylinder $110_1$. The relative position/orientation between the first boom segment $36_1$ and the second boom segment $36_2$ is controlled by a second hydraulic cylinder $110_2$. Likewise, the relative position/orientation between the third boom segment $36_3$ and the second boom segment $36_2$ may be controlled by a third hydraulic cylinder $110_3$, and the relative position/orientation between the fourth boom segment $36_4$ and the third boom segment $36_3$ may be controlled by a fourth hydraulic cylinder $110_4$.

According to the principles of the present disclosure, the boom 30, including the plurality of boom segments $36_{1-4}$, may be modeled and vibration of the boom 30 may be controlled by the controller 640. In particular, the controller 640 may send a signal to the valve 700 and a signal to the valve 800. The signals may include vibration components. The vibration components may cause the respective valve 700, 800 to produce a vibratory flow and/or a vibratory pressure at the respective port 702, 804. The vibratory flow and/or the vibratory pressure may be transferred through the respective counter-balance valve 300, 400 and to the respective chamber 116, 118 of the hydraulic cylinder 110.

The signals of the controller 640 may also include move signals that cause the hydraulic cylinder 110 to extend and retract, respectively, and thereby actuate the boom 30. As will be further described below, the signals of the controller 640 may simultaneously move the hydraulic cylinder 110 and at least partially cancel vibrations, disturbances, and/or unwanted behavior imposed upon the boom 30 and/or the hydraulic cylinder 110.

Figure 3:
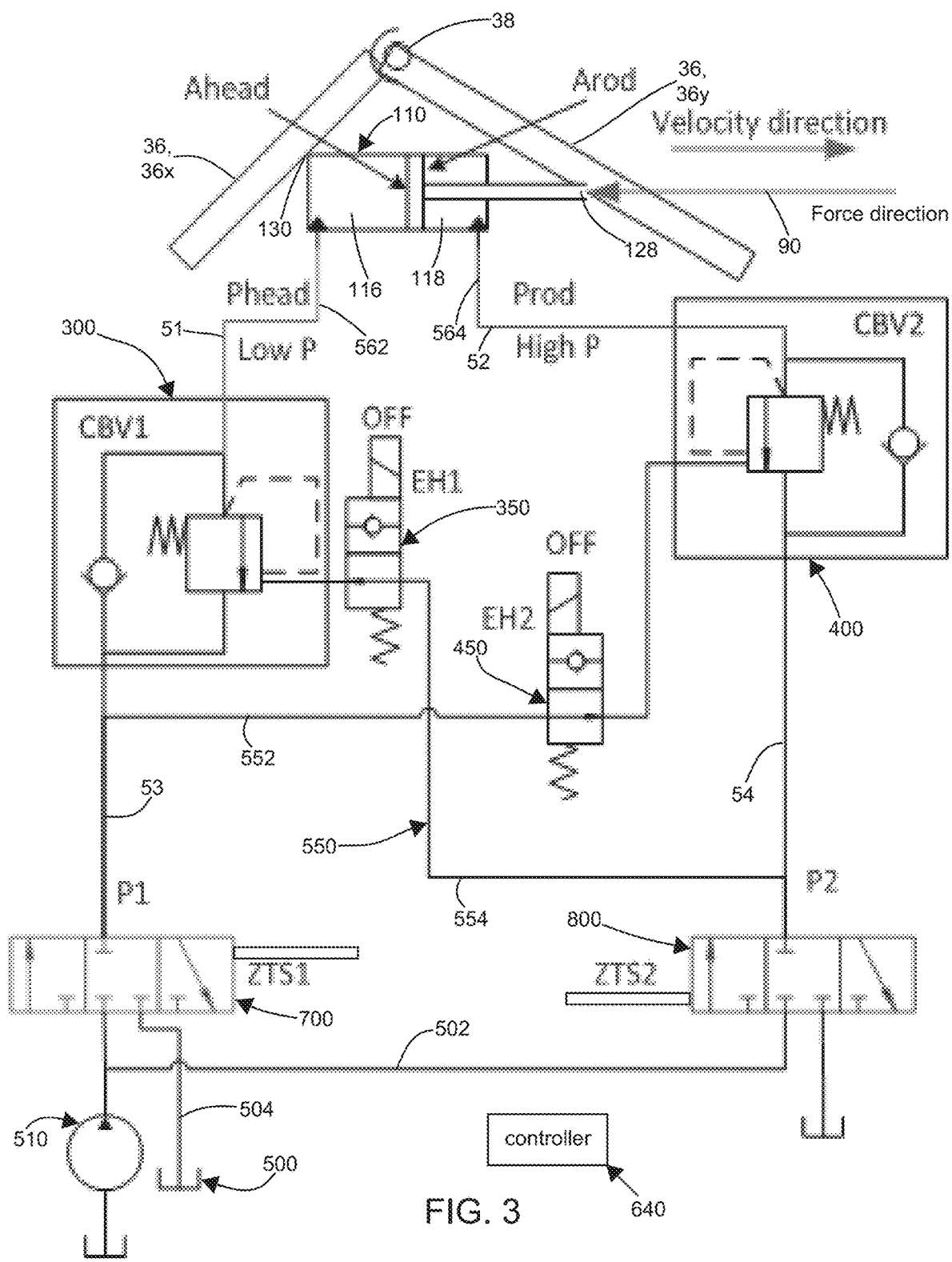
FIG. 3 is the schematic illustration of FIG. 2, but with an external force reversed.

In certain embodiments, a direction of the load 90 on the hydraulic cylinder 110 is determined and/or continuously monitored by the controller 640. For example, the equation:

$$Fhyd = Ahead \times Phead - Arod \times Prod$$

where:
Fhyd is a value of the reaction of the hydraulic cylinder 110 to the net external load 90,
Ahead is an area of the piston 120 facing the head chamber 116,
Phead is a pressure acting on Ahead,
Arod is an area of the piston 120 facing the rod chamber 118, and
Prod is a pressure acting on Arod,
gives a positive value for Fhyd if the reaction force produced by the hydraulic cylinder 110 is to the right (i.e., the hydraulic cylinder 110 is in compression), as shown at FIG. 3, and gives a negative value for Fhyd if the reaction force produced by the hydraulic cylinder 110 is to the left (i.e., the hydraulic cylinder 110 is in tension), as shown at FIG. 2.

Upon calculating the direction of the load 90 on the hydraulic cylinder 110, a load carrying chamber 116, 118 of the hydraulic cylinder 110 is determined (e.g., the head chamber 116 if Fhyd is positive or the rod chamber 118 if Fhyd is negative). Upon knowing the load carrying chamber 116, 118 of the hydraulic cylinder 110, a steady-state, a quasi-steady-state, and/or a DC pressure may be supplied to the load carrying chamber 116, 118. If vibrations, disturbances, and/or unwanted behavior imposed upon the boom 30 and/or the hydraulic cylinder 110 are to be at least partially canceled, a dynamic pressure, an AC pressure, and/or a dynamic flow rate of hydraulic fluid may be supplied to the opposite chamber 118, 116. At FIG. 2, the load carrying chamber is the rod chamber 118, and at FIG. 3, the load carrying chamber is the head chamber 116.

To facilitate allowing flow to pass from the load carrying chamber 116, 118 through the control valve 700, 800 when the load is overrunning (i.e., movement of the hydraulic cylinder 110 is in a same direction as the net external force 90), the corresponding counter-balance valve 300, 400 is held open by pressure from the control valve 800, 700 corresponding to the opposite chamber 118, 116.

For example, an overrunning load is illustrated at FIG. 2 with the rod chamber 118 as the load holding chamber. A velocity of the hydraulic cylinder 110 may be controlled by configuring the control valve 800 in a flow control mode. The counter-balance valve 400 is held open by pressure from the control valve 700. The control valve 700 may be configured in a pressure control mode. If vibrations, etc. are to be at least partially canceled, a dynamic pressure/flow may be supplied to the chamber 116 by the control valve 700. The counter-balance valve 300 may be held open by pressure from the control valve 800. To keep both of the counter-balance valves 300, 400 open, hydraulic pressure supplied to both chambers 116, 118 may be incrementally increased to keep pilot pressures at both of the ports 306, 406 above an opening pressure of the counter-balance valves 300, 400.

To facilitate allowing flow to pass from the non-load carrying chamber 116, 118 through the control valve 700, 800 when the load is non-overrunning (i.e., movement of the hydraulic cylinder 110 is in an opposite direction as the net external force 90), the corresponding counter-balance valve 300, 400 is held open by pressure from the control valve 800, 700 corresponding to the opposite chamber 118, 116.

For example, a non-overrunning load is illustrated at FIG. 3 with the head chamber 116 as the load holding chamber. A velocity of the hydraulic cylinder 110 may be controlled by configuring the control valve 700 in a flow control mode. The counter-balance valve 400 may be held open by pressure from the control valve 700. The control valve 800 may be configured in a pressure control mode. If vibrations, etc. are to be at least partially canceled, a dynamic pressure/flow may be supplied to the chamber 118 by the control valve 800. The counter-balance valve 400 may be held open by pressure from the control valve 700. To keep both of the counter-balance valves 300, 400 open, hydraulic pressure supplied to both chambers 116, 118 may be incrementally increased to keep pilot pressures at both of the ports 306, 406 above the opening pressure of the counter-balance valves 300, 400.

The controller 640 may receive input from various sensors, including the sensors P1, P2, Phead, Prod, remote sensors, position sensors, LVDTs 730, 830, vision base sensors, etc. and thereby compute the signals, including the vibration component. The controller 640 may include a dynamic model of the boom 30 and use the dynamic model and the input from the various sensors to calculate the various signals, including the vibration component.

In certain embodiments, a single system such as the hydraulic system 600 may be used on one of the hydraulic cylinders 110 (e.g., the hydraulic cylinder $110_1$). In other embodiments, a plurality of the hydraulic cylinders 110 may each be actuated by a corresponding hydraulic system 600. In still other embodiments, all of the hydraulic cylinders 110 may each be actuated by a system such as the system 600.

Turning now to FIG. 2, certain elements of the hydraulic system 600 will be described in detail. The example hydraulic system 600 includes the proportional hydraulic control valve 700 and the proportional hydraulic control valve 800. In the depicted embodiment, the hydraulic valves 700 and 800 are three-way three position proportional valves. The valves 700 and 800 may be combined within a common valve body. In certain embodiments, some or all of the valves 300, 350, 400, 450, 700, and/or 800 of the hydraulic system 600 may be combined within a common valve body and/or a common valve block. In certain embodiments, some or all of the valves 300, 350, 400, 450, 700, and/or 800 of the valve arrangement 840 may be combined within a common valve body and/or a common valve block. In certain embodiments, the valves 300, 350, and/or 700 of the valve arrangement 840 may be combined within a common valve body and/or a common valve block. In certain embodiments, the valves 400, 450, and/or 800 of the valve arrangement 840 may be combined within a common valve body and/or a common valve block.

The hydraulic valve 700 may include a spool 720 with a first configuration 722, a second configuration 724, and a third configuration 726. As illustrated, the spool 720 is at the third configuration 726. The valve 700 includes a port 702, a port 712, and a port 714. In the first configuration 722, the port 714 is blocked off, and the port 702 is fluidly connected to the port 712. In the second configuration 724, the ports 702, 712, 714 are all blocked off. In the third configuration 726, the port 702 is fluidly connected to the port 714, and the port 712 is blocked off. A position of the spool 720 may be monitored by a position sensor 730. The position sensor 730 may include a linear variable differential transformer (LVDT).

The hydraulic valve 800 may include a spool 820 with a first configuration 822, a second configuration 824, and a third configuration 826. As illustrated, the spool 820 is at the third configuration 826. The valve 800 includes a port 804, a port 812, and a port 814. In the first configuration 822, the port 812 is blocked off, and the port 804 is fluidly connected to the port 814. In the second configuration 824, the ports 804, 812, 814 are all blocked off. In the third configuration 826, the port 804 is fluidly connected to the port 812, and the port 814 is blocked off. A position of the spool 820 may be monitored by a position sensor 830. The position sensor 830 may include a linear variable differential transformer (LVDT).

In the depicted embodiment, a hydraulic line 562 connects the port 302 of the counter-balance valve 300 with the port 122 of the hydraulic cylinder 110. Node 51 may include the hydraulic line 562. A hydraulic line 564 may connect the port 402 of the counter-balance valve 400 with the port 124 of the hydraulic cylinder 110. Node 52 may include the hydraulic line 564. In certain embodiments, the hydraulic lines 562 and/or 564 are included in valve blocks, housings, etc. and may be short in length. A hydraulic line 552 may connect the port 304 of the counter-balance valve 300 with the port 702 of the hydraulic valve 700 and with the port 462 of the valve 450. Node 53 may include the hydraulic line 552. Likewise, a hydraulic line 554 may connect the port 404 of the counter-balance valve 400 with the port 804 of the hydraulic valve 800 and with the port 362 of the valve 350. Node 54 may include the hydraulic line 554. A hydraulic line (unnumbered) may connect the port 306 of the counter-balance valve 300 with the port 352 of the valve 350, and node 55 may include this hydraulic line. Likewise, a hydraulic line (unnumbered) may connect the port 406 of the counter-balance valve 400 with the port 452 of the valve 450, and node 56 may include this hydraulic line. In other embodiments, the ports 306 and 352 may directly connect to each other. Likewise, the ports 406 and 452 may directly connect to each other.

As illustrated at FIGS. 2 and 3, the valve 350 is a two-way two position valve. In particular, the valve 350 includes the first port 352 and the second port 362. The valve 350 includes a spool 370 with a first configuration 372 and a second configuration 374. In the first configuration 372 (depicted at FIG. 2), the port 352 and the port 362 are fluidly connected. In the second configuration 374, the port 362 and the port 352 are connected with a one-way flow device 364 (e.g., a check valve). As depicted, the valve 350 includes a solenoid 376 and a spring 378. The solenoid 376 and the spring 378 can be used to move the spool 370 between the first configuration 372 and the second configuration 374. The valve spool 370 is positioned at the first configuration 372 when the solenoid 376 is unpowered. As depicted, the one-way flow device 364 allows flow from node 55 to node 54 and prevents flow from node 54 to node 55 when the valve spool 370 is positioned at the second configuration 374.

As depicted, the valve 450 is also a two-way two position valve. In particular, the valve 450 includes the first port 452 and the second port 462. The valve 450 includes a spool 470 with a first configuration 472 and a second configuration 474. In the first configuration 472, the port 452 and the port 462 are fluidly connected. In the second configuration 474, the port 462 and the port 452 are connected with a one-way flow device 464 (e.g., a check valve). As depicted, the valve 450 includes a solenoid 476 and a spring 478. The solenoid 476 and the spring 478 can be used to move the spool 470 between the first configuration 472 and the second configuration 474. As depicted, the valve spool 470 is positioned at the first configuration 472 when the solenoid 476 is unpowered. As depicted, the one-way flow device 464 allows flow from node 56 to node 53 and prevents flow from node 53 to node 56 when the valve spool 470 is positioned at the second configuration 474.

When the valves 350 and 450 are both positioned at the first configurations 372 and 472 (see FIG. 2), respectively, the hydraulic system 600 may function the same as or similar to the conventional hydraulic system 100, described above. The hydraulic system 600 may include a "conventional" mode that configures the valves 350 and 450 at the first configurations 372, 472. The "conventional" mode may disable and/or deactivate the vibration control features of the hydraulic system 600. The "conventional" mode may be selected by a machine operator and/or may be selected automatically (e.g., by the controller 640). Manual or automatic selection of the "conventional" mode may be implemented by the controller 640 (e.g., by sending electrical signals to the solenoids 376 and/or 476). As depicted, a lack of power at the solenoids 376, 476 corresponds with the selection of the "conventional" mode. In other embodiments, providing power to the solenoids 376 and/or 476 corresponds with the selection of the "conventional" mode (e.g., configures the valves 350 and/or 450 at the first configurations 372 and/or 472). In certain embodiments, the valve spools 370 and/or 470 may be manually positioned (e.g., by a linkage). In certain embodiments, the valve spools 370 and/or 470 may be positioned by pilot hydraulic pressure. In certain embodiments, the "conventional" mode may be selected when cylinder movements of the hydraulic cylinder 110 are executed (e.g., when a position configuration change of the boom 30 is executed).

The counter-balance valve 300 may develop/exhibit internal fluid leakage under certain conditions and/or in certain embodiments. For example, the internal fluid leakage may transfer hydraulic fluid from node 51 to node 55 and/or may transfer hydraulic fluid from node 53 to node 55. If such internal fluid leakage occurs and is not allowed to drain, pressure may develop at node 55. If the pressure at node 55 exceeds the pilot opening pressure of the counter-balance valve 300, the spool 310 may be actuated by the pressure at node 55, and the counter-balance valve 300 may open. However, the one-way flow device 364 of the valve 350 allows node 55 to drain to node 54. In particular, the vibratory flow and/or the vibratory pressure may be generated so that at least periodically the pressure at node 54 is below the pilot opening pressure of the counter-balance valve 300. Thus, the one-way flow device 364 of the valve 350 allows node 55 to drain to node 54 when the pressure at node 54 is below the pilot opening pressure of the counter-balance valve 300, and the pressure at node 55 may remain below the pilot opening pressure of the counter-balance valve 300 in this configuration of the hydraulic system 600.

The counter-balance valve 400 may develop/exhibit internal fluid leakage under certain conditions and/or in certain embodiments. For example, the internal fluid leakage may transfer hydraulic fluid from node 52 to node 56 and/or may transfer hydraulic fluid from node 54 to node 56. If such internal fluid leakage occurs and is not allowed to drain, pressure may develop at node 56. If the pressure at node 56 exceeds the pilot opening pressure of the counter-balance valve 400, the spool 410 may be actuated by the pressure at node 56, and the counter-balance valve 400 may open. However, the one-way flow device 464 of the valve 450 allows node 56 to drain to node 53. In particular, the vibratory flow and/or the vibratory pressure may be generated so that at least periodically the pressure at node 53 is below the pilot opening pressure of the counter-balance valve 400. Thus, the one-way flow device 464 of the valve 450 allows node 56 to drain to node 53 when the pressure at node 53 is below the pilot opening pressure of the counter-balance valve 400, and the pressure at node 56 may remain below the pilot opening pressure of the counter-balance valve 400 in this configuration of the hydraulic system 600.

In other embodiments, other methods of draining nodes 55 and/or 56 may be implemented.

In certain applications, the hydraulic actuator (e.g., the hydraulic cylinder 110) may always be or may predominantly be loaded in a same direction when the vibration control features (e.g., of the hydraulic system 600) are desired. For example, the hydraulic cylinder 110$_1$ of the boom 30 may always be or may predominantly be loaded in compression, and the chamber 116 of the hydraulic cylinder 110$_1$ may always be or may predominantly be the load holding chamber when the vibration control features are desired. In such applications, one of the valves 350 or 450 may be removed from the hydraulic system 600. For example, if the chamber 116 of the hydraulic cylinder 110 is always or is predominantly the load holding chamber, the valve 450 may be removed and nodes 53 and 56 may be combined. As another example, if the chamber 118 of the hydraulic cylinder 110 is always or is predominantly the load holding chamber, the valve 350 may be removed and nodes 54 and 55 may be combined.

Sensors that measure temperature and/or pressure at various ports of the valves 700, 800 and/or at other locations may be provided. In particular, a sensor P1 is provided adjacent the port 702 of the valve 700. As depicted, the sensor P1 is a pressure sensor and may be used to provide dynamic information about the system 600 and/or the boom system 10. As depicted at FIG. 2, a second sensor P2 is provided adjacent the port 804 of the hydraulic valve 800. The sensor P2 may be a pressure sensor and may be used to provide dynamic information about the hydraulic system 600 and/or the boom system 10. A third sensor may be provided adjacent the port 814 of the valve 800, and a fourth sensor may be provided adjacent the port 812 of the valve 800. The additional sensors may also be used to provide dynamic information about the hydraulic system 600 and/or the boom system 10. A sensor Phead may be a pressure sensor provided adjacent the port 122 of the chamber 116 of the hydraulic cylinder 110, and a sensor Prod may be a pressure sensor provided adjacent the port 124 of the chamber 118 of the hydraulic cylinder 110. In certain embodiments, a sensor may be capable of measuring relative position, velocity, and/or acceleration of the rod 126 relative to the head side 112 and/or housing of the hydraulic cylinder 110. In certain embodiments, a sensor capable of measuring relative position, velocity, and/or acceleration of the rod 126 relative to the head side 112 and/or housing of the hydraulic cylinder 110 is not used. The sensors may also be used to provide dynamic information about the hydraulic system 600 and/or the boom system 10. The various sensors may provide feedback signals to the controller 640.

In certain embodiments, pressure within the supply line 502 and/or pressure within the tank line 504 are well known, and the sensors P1, P2, 730, and 830 may be used to calculate flow rates through the valves 700 and 800, respectively. In other embodiments, a pressure difference across the valve 700, 800 is calculated. For example, the pressure sensor P2 and the position sensor 830 may be used when the spool 820 of the valve 800 is at or near the first position 822 and thereby calculate flow through the valve 800. Likewise, a pressure difference may be calculated when the spool 820 of the valve 800 is at the third configuration 826. The controller 640 may use these pressures and pressure differences as control inputs.

Temperature sensors may further be provided at and around the valves 700, 800 and thereby refine the flow measurements by allowing calculation of the viscosity and/or density of the hydraulic fluid flowing through the valves 700, 800. The controller 640 may use these temperatures as control inputs.

Further, such sensors may be positioned at various other locations in other embodiments. In certain embodiments, the sensors P1 and P2 may be positioned within a common valve body. In certain embodiments, an Ultronics® servo valve available from Eaton Corporation may be used. The Ultronics® servo valve provides a compact and high performance valve package that includes two three-way valves (i.e., the valves 700 and 800), the pressure sensors P1 and P2, and a pressure regulation controller (e.g., included in the controller 640). The Ultronics® servo valve may serve as the valve assembly 690. The Eaton Ultronics® servo valve further includes linear variable differential transformers 730, 830 (LVDTs) that monitor positions of the spools 720, 820, respectively. By using the two three-way proportional valves 700, 800, the pressures of the chambers 116 and 118 may be independently controlled. In addition, the flow rates into and/or out of the chambers 116 and 118 may be independently controlled. In other embodiments, the pressure of one of the chambers 116, 118 may be independently controlled with respect to a flow rate into and/or out of the opposite chambers 116, 118.

In comparison with using a single four-way proportional valve 200 (see FIG. 1), the configuration of the hydraulic system 600 can achieve and accommodate more flexible control strategies with less energy consumption. For example, when the cylinder 110 is moving, the valve 700, 800 connected with the metered-out chamber 116, 118 can manipulate the chamber pressure while the valves 800, 700 connected with the metered-in chamber can regulate the flow entering the chamber 118, 116. As the metered-out chamber pressure is not coupled with the metered-in chamber flow, the metered-out chamber pressure can be regulated to be low and thereby reduce associated throttling losses.

The supply line 502, the return line 504, the hydraulic line 552, the hydraulic line 554, the hydraulic line 562, the hydraulic line 564, a hydraulic line extending between the ports 306 and 352, and/or a hydraulic line extending between the ports 406 and 452 may belong to a line set 550.

Upon vibration control being deactivated (e.g., by an operator input), the hydraulic system 600 may configure the valve arrangement 840 as a conventional counter-balance/control valve arrangement.

Turning now to FIGS. 2 and 3, certain components of the counter-balance valve 300, 400 will be described in detail. The counter-balance valve 300, 400 includes a first port 302, 402, a second port 304, 404, and a third port 306, 406, respectively. As depicted, the port 302, 402 is fluidly connected to a hydraulic component (e.g., the hydraulic cylinder 110). The port 304, 404 is fluidly connected to a control valve (e.g., the control valve 700, 800). The port 306, 406 is a pilot port that is selectively fluidly connected to the port 404, 304 of an opposite counter-balance valve via the valve 350, 450. By selectively connecting the port 306, 406 to the port 404, 304 of the opposite counter-balance valve, the port 306, 406 is also selectively fluidly connected to a control valve 800, 700 that is opposite the control valve 700, 800 that is connected to the port 304, 404.

The spool 310, 410 is movable within a bore of the counter-balance valve 300, 400. In particular, a net force on the spool 310, 410 moves or urges the spool 310, 410 to move within the bore. The spool 310, 410 includes a spring area and an opposite pilot area. The spring area is operated on by a pressure at the port 304, 404. Likewise, the pilot area is operated on by a pressure at the port 306, 406. In certain embodiments, a pressure at the port 302, 402 may have negligible or minor effects on applying a force that urges movement on the spool 310, 410. In other embodiments, the spool 310, 410 may further include features that adapt the counter-balance valve 300, 400 to provide a relief valve function responsive to a pressure at the port 302, 402. In addition to forces generated by fluid pressure acting on the spring and pilot areas, the spool 310, 410 is further operated on by a spring force. In the absence of pressure at the ports 304, 404 and 306, 406, the spring force urges the spool 310, 410 to seat and thereby prevent fluid flow between the ports 302, 402 and 304, 404. As illustrated at FIG. 1, a passage 322, 422 and check valves 320, 420 allow fluid to flow from the port 304, 404 to the port 302, 402 by bypassing the seated spool 310, 410. However, flow from the port 302, 402 to the port 304, 404 is prevented by the check valve 320, 420, when the spool 310, 410 is seated.

The sensors P1, P2 can be used to detect the frequency, phase, and/or amplitude of any external vibrational inputs to the hydraulic cylinder 110. Alternatively or additionally, vibrational inputs to the hydraulic cylinder 110 may be measured by an upstream pressure sensor (e.g., the sensors Phead, Prod), an external position sensor, an external acceleration sensor, and/or various other sensors.

The vibration cancellation algorithm can take different forms. In certain embodiments, the frequency and phase of the external vibration may be identified by a filtering algorithm (e.g., by Least Mean Squares, Fast Fourier Transform, etc.). In certain embodiments, the frequency, the amplitude, and/or the phase of the external vibration may be identified by various conventional means. In certain embodiments, upon identifying the frequency, the amplitude, and/or the phase of the external vibration, a pressure signal with the same frequency and appropriate phase shift may be applied at the unloaded chamber 116, 118 to cancel out the disturbance caused by the external vibration. The control valves 700 and/or 800 may be used along with the controller 640 to continuously monitor flow through the control valves 700 and/or 800 to ensure no unexpected movements occur.

In the depicted embodiments, the sensors P1 and P2 are shielded from measuring the pressures at the ports 122 and 124 of the hydraulic cylinder 110, respectively, by the counter-balance valves 300 and 400. In certain embodiments, methods independent of the sensors P1 and P2 can be used to determine the direction of the net load 90 on the cylinder 110 and to determine external vibrations acting on the cylinder 110. In certain embodiments, pressure sensors (e.g., the pressure sensors Phead and Prod at the ports 122 and/or 124 may be used. In other embodiments, other pressure sensors may be used. Alternatively or additionally, other sensors such as accelerometers, position sensors, visual tracking of the boom 30, etc. may be used (e.g., a position, velocity, and/or acceleration sensor that tracks movement of the rod 126 of the hydraulic cylinder 110).

In embodiments where the direction of the net cylinder load 90 is independently known to be acting on the chamber 116 but at least some of the parameters of the external vibration acting on the hydraulic cylinder 110 are unknown from external sensor information, the pressure sensor Prod may be used to measure pressure fluctuations within the chamber 118 and thereby determine characteristics of the external vibration. If the direction of the net cylinder load is independently known to be acting on the chamber 118 but at least some of the parameters of the external vibration acting on the hydraulic cylinder 110 are unknown from external sensor information, the pressure sensor Phead may be used to measure pressure fluctuations within the chamber 116 and thereby determine characteristics of the external vibration.

An environmental vibration load is imposed as a component of the net load 90 on the hydraulic cylinder 110. The vibration load component does not typically include a steady state load component. In certain applications, the vibration load includes dynamic loads such as wind loads, momentum loads of material that may be moved along the boom 30, inertial loads from moving the vehicle 20, and/or other dynamic loads. Certain concrete pumps may include a pulse-like pumping profile with a pulse frequency of about 1 Hertz. A velocity profile (i.e., a volumetric rate profile) of concrete at an outlet of such concrete pumps may fluctuate significantly over each period of the profile. The varying velocity profile corresponds with a varying acceleration profile and may result in significant inertial loads being imposed on the boom 30. The steady state load may include gravity loads that may vary depending on the configuration of the boom 30. The hydraulic cylinder 110 may also include a steady state component (i.e., a static component) that may reflect static loads such as gravity. The vibration load may be sensed and estimated/measured by the various sensors P1, P2, Phead, Prod and/or other sensors. The controller 640 may process these inputs and use a model of the dynamic behavior of the boom system 10 and thereby calculate and transmit an appropriate vibration signal. The vibration signal is transformed into hydraulic pressure and/or hydraulic flow at the corresponding valve 700, 800. The vibratory pressure/flow is transferred through the corresponding counter-balance valve 300, 400 and to the corresponding chamber 116, 118 of the hydraulic cylinder 110. The hydraulic cylinder 110 transforms the vibratory pressure and/or the vibratory flow into the vibratory response force/displacement. When the vibratory response and the vibration load are superimposed on the boom 30, a resultant vibration is produced. The resultant vibration may be substantially less than a vibration of the boom 30 generated without the vibratory response. Vibration of the boom 30 may thereby be controlled and/or reduced enhancing the performance, durability, safety, usability, etc. of the boom system 10. The vibratory response of the hydraulic cylinder 110 may be a dynamic component of the output of the hydraulic cylinder 110. The hydraulic cylinder 110 may also include a steady state component (i.e., a static component) that may reflect static loads such as gravity.

According to the principles of the present disclosure, a control method uses independent metering main control valves 700, 800 with embedded sensors P1, P2 (e.g., embedded pressure sensors) that can sense oscillating pressure and provide a ripple cancelling pressure with counter-balance valves 300, 400 (CBVs) installed.

According to the principles of the present disclosure, active ripple cancelling is provided, an efficiency penalty of orifices is avoided, and/or the main control valves 700, 800 may be the only control elements. According to the principles of the present disclosure, embedded pressure sensors P1, P2 embedded in the valve 700, 800 and/or external pressure/acceleration/position sensors Phead, Prod may be used.

As mentioned above, the example system 600 provides a hydraulic power and control system for actuating the hydraulic actuator 110 with counter-balance valves 300, 400 and further includes methods and components to detect various faults and prevent the various faults from resulting in the boom 30 falling. The system 600 is arranged to prevent all single point failures, within the system 600, from resulting in the boom 30 falling.

In a baseline operation, where both of the valves 350 and 450 are open (e.g., not energized), components that may potentially fail include either of the counter-balance valves 700, 800, either of the valves 350 and 450, either of the pressure sensors Phead, Prod, either of the control valves 700, 800, a three-way control valve package including the control valves 700, 800, and either of the hydraulic lines 552, 554 that are connected between the control valves 700, 800 and the counter-balance valves 300, 400, respectively.

According to the principles of the present disclosure, a variety of solutions are included to prevent each of the single point failures, both mentioned above and others, from causing the boom 30 to fall. For example, if either of the control valves 700, 800 are operating as a meter-out valve, and the control valve 700, 800 is stuck in an open position to the tank 500 (i.e., the spool 720, 820 is stuck in the configuration 726, 822), the following procedures may be used to detect and mitigate this fault. Two signals may be used to indicate that a stuck-open fault exists with the control valves 700, 800. In particular, if a spool position, as indicated by the position sensors 730, 830, does not match a spool position command transmitted by the controller 640, then the control valve 700, 800 may be stuck-open to the tank 500.

In addition, if hydraulic fluid flow at the control valve 700, 800 does not follow a reference flow command from the controller 640, then the control valve 700, 800 may be stuck-open to the tank 500. If a hydraulic fluid flow through the control valve 700, 800 is greater than a specified flow limit, then the control valve 700, 800 may be stuck-open to tank 500.

Upon detecting a fault with the control valve 700, 800, motion of the actuator 110 may be stopped by using the opposite control valve 800, 700 to regulate the pilot pressure to the corresponding counter-balance valve 300, 400 and thereby close the corresponding counter-balance valve 300, 400. Using the opposite control valve 800 to lower the pilot pressure on the corresponding counter-balance valve 300, 400 and thereby stop hydraulic fluid flow through the stuck control valve 700, 800 may be used when the control valve 700, 800 is stuck-open to the tank 500 and, in particular, may be used when the control valve 700, 800 is functioning as the meter-out valve 700, 800. The actuator 110 may thereby be stopped while carrying an over-running load.

To mitigate the fault of the control valve 700, 800 being stuck open to the tank 500, the opposite control valve 800, 700 may be used to control the corresponding counter-balance valve 300, 400 and thereby use the corresponding counter-balance valve 300, 400 to throttle flow as a meter-out orifice and thereby regulate flow out of the meter-out chamber 116, 118 and thereby allow the boom 30 to be safely lowered to a ground position. The control valve 700, 800 may be used in a flow control mode during the boom lowering mitigation process.

When the control valve 700, 800 is in the flow control mode, simultaneously an upper limit will be imposed on the opposite control valve 800, 700 output flow and thereby limit the maximum flow that the control valve 700, 800 can provide to the meter-in chamber 116, 118. If the boom 30 begins to fall, the pressure P1, P2 will fall automatically and thereby limit supply flow by reducing the pilot pressure to the opposite counter-balance valve 400, 300. The opposite counter-balance valve 400, 300 will thereby close and prevent the boom 30 from falling further.

As an additional safety measure, the counter-balance valve pilot cut off valves 350, 450 may be energized and thereby provide an additional method of stopping the hydraulic actuator 110. This step may be performed in conjunction with other mitigation methods. Energizing the valves 350, 450 may be done as an initial response and allow an operator to open the valves 350, 450 and thereby attempt to lower the boom 30. This procedure may be used to mitigate any fault, other than faults to the valves 350, 450 themselves. However, if the pilot line (i.e., a line represented by the node 55, 56) is at a pressure higher than an opening pressure for the corresponding counter-balance valve 300, 400, then energizing the valve 350, 450 may not close the counter-balance valve 300, 400 until the pressure can be drained back into the pilot line 554, 552. By closing the valves 350, 450, the risk of a falling boom 30 is reduced even if residual pressure must be drained back into the pilot lines 554, 552.

According to the principles of the present disclosure, a fault of the control valve 700, 800 being stuck-open to supply 502 may be detected and mitigated. In particular, a stuck-open fault of the control valves 700, 800 may be detected by monitoring two signals. In particular, if a position of the spool 720, 820, as measured by the position sensor 730, 830, does not match a spool position command transmitted by the controller 640 to the control valve 700, 800, then the control valve 700, 800 may be stuck-open to the supply 502. In addition, if the flow across the control valve 700, 800 does not follow a reference flow command, transmitted by the controller 640, then the control valve 700, 800 may be stuck-open to the supply 502. If a flow limit of the control valve 700, 800 is exceeded, then the control valve 700, 800 may be stuck-open to the supply 502.

To mitigate the control valve 700, 800 being stuck-open to the supply 502, a test may be performed to see if a supply pressure Ps is less than a load pressure Pload (i.e., Phead or Prod). If the supply pressure Ps is less than the load pressure Pload, then a same solution may be implemented as described above (in dealing with the control valve 700, 800 being stuck-open to the tank 500). If the test indicates that the supply pressure Ps is greater than the load pressure Pload, then the opposite control valve 800, 700 may be neutralized or opened to the tank 500 to stop the boom 30 from falling. In particular, the pump 510 may lower the supply pressure Ps to a pressure below the load pressure Pload. Upon the supply pressure Ps being reduced below the load pressure Pload, the boom 30 can be lowered following the above method of mitigating the control valve 700, 800 being stuck-open to the tank 500.

According to the principles of the present disclosure, a fault of a hydraulic line 552, 554 bursting on the meter-out side may be detected and mitigated. In particular, a burst meter-out side hydraulic line 552, 554 may be detected by monitoring a meter-in flow and a meter-out flow crossing the control valves 700, 800. Upon a burst hydraulic line 552, 554 being detected, the opposite control valve 800, 700 may be used to control the flow into the meter-in chamber 116, 118. By controlling the flow into the meter-in chamber with the opposite control valve 700, 800, an appropriate pressure will be supplied to the pilot 406, 306 of the counter-balance valve 400, 300 thereby opening the counter-balance valve 400, 300 enough to lower the boom 30 in a controlled manner. If no flow is supplied by the opposite control valve 700, 800, then the counter-balance valve 400, 300 will close and the actuator 110 will stop.

According to the principles of the present disclosure, a counter-balance valve 300, 400 that is stuck open may be detected and the fault mitigated. In particular, the counter-balance valve 300, 400 may be tested to determine if the counter-balance valve 300, 400 is stuck open. Because the control valves 700, 800 provide meter-out throttling, a failure of the counter-balance valves 300, 400 will not directly result in the boom 30 falling. However, upon detecting a stuck-open condition of either of the counter-balance valves 300, 400, maintenance may be performed to resolve the fault. To detect if the counter-balance valve 300, 400 is stuck-open, the actuator 110 may be held stationary, and both the control valves 700, 800 may be configured in a flow control mode. A command may be sent from the controller 640 to the control valves 700, 800 to drain a very small amount of hydraulic fluid from the hydraulic lines 552, 554 to the tank 500. If either of the pressures P1, P2 remain high, then the corresponding counter-balance valve 300, 400 may be stuck open. Upon a counter-balance valve stuck-open failure being detected, the boom 30 may be lowered and maintenance may be performed.

If the counter-balance valve 300, 400 is stuck closed, the meter-out chamber pressure will increase abnormally and this abnormally high chamber out pressure Phead, Prod may be used to indicate the corresponding counter-balance valve 300, 400 is stuck closed. In a case where the counter-balance valve 300, 400 is stuck closed, the fault may be detected and mitigation efforts beyond the scope of manipulating the system 600 may be used. In faults other than a stuck-closed counter-balance valve 300, 400 a manual override may be provided to the operator and/or control system and the manual override system may be used to lower the boom 30.

Figure 4:
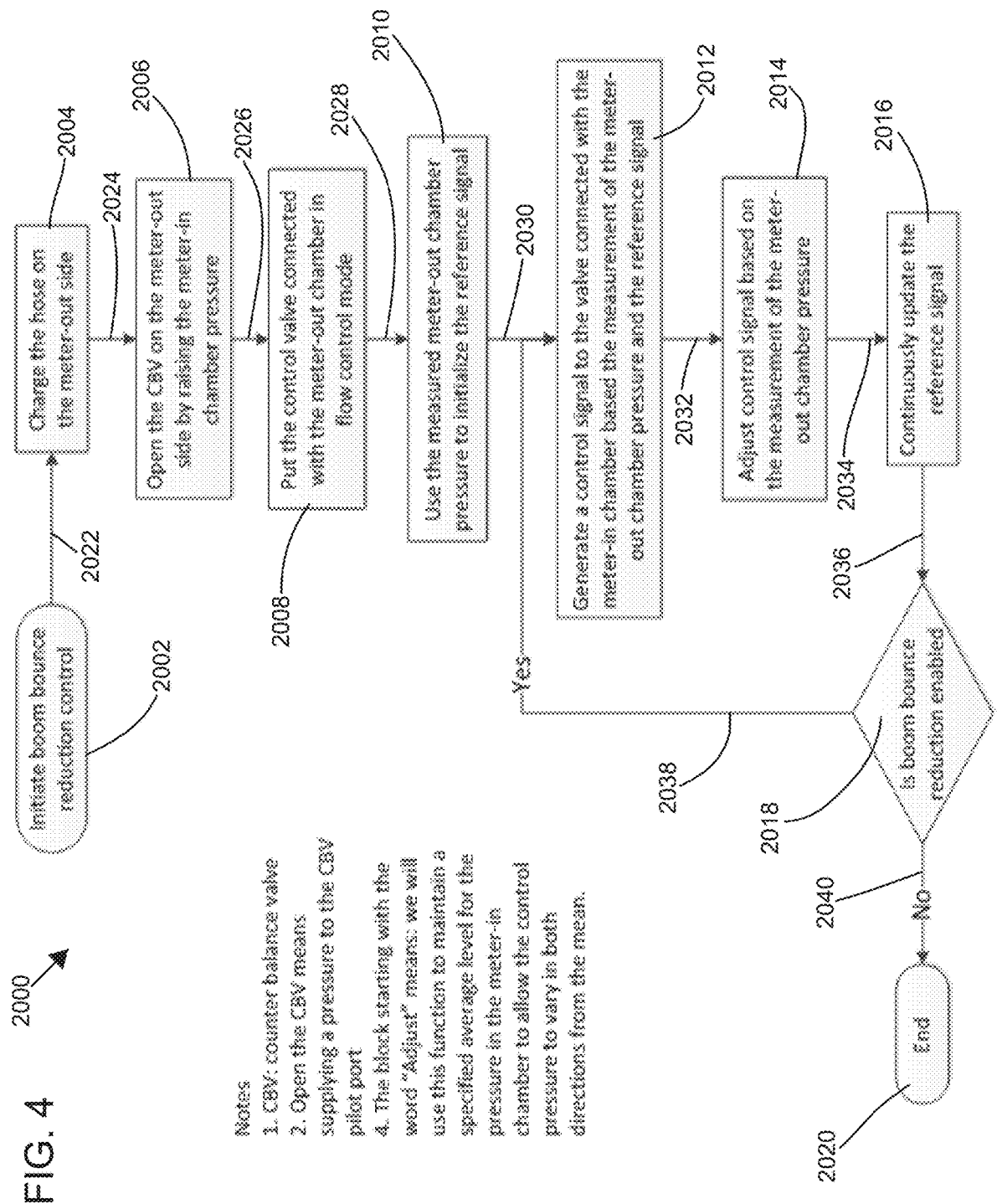
FIG. 4 is a flow chart illustrating a method of implementing boom bounce reduction according to the principles of the present disclosure.

Turning now to FIG. 4, a flowchart 2000 of a method for reducing boom bounce is illustrated according to the principles of the present disclosure. The flowchart 2000 is initiated at starting position 2002. Control continues from the starting position 2002 along path 2022 to step 2004. The step 2004 includes charging a hydraulic line 552, 554 on the meter-out side. The meter-out side hydraulic line 552, 554 to be charged depends on a configuration of the system 600. In particular, if the rod 126 is extending out of the hydraulic cylinder 110, the meter-out side hydraulic line would be hydraulic line 554. Alternatively, if the rod 126 of the hydraulic cylinder 110 is being retracted into the hydraulic cylinder 110, then the meter-out side hydraulic line would be hydraulic line 552. Charging the meter-out side hydraulic line 552, 554 prepares the system 600 for using the meter-out control valve 700, 800 to pressurize the meter-out chamber 116, 118 with continuity upon the meter-out counter-balance valve 300, 400 being opened. Without appropriately pre-charging the meter-out side hydraulic line 552, 554, a pressure discontinuity may be created as the meter-out counter-balance valve 300, 400 is first opened.

Upon charging the meter-out side hydraulic line 552, 554 control proceeds along path 2024 to step 2006. At step 2006, the counter-balance valve 300, 400 on the meter-out side is opened by raising the meter-in chamber pressure. As mentioned above, if the meter-out side has flow through the counter-balance valve 400, then control valve 700 raises the meter-in chamber pressure to open the counter-balance valve 400. If the meter-out side has flow through the counter-balance valve 300, then control valve 800 raises the meter-in chamber pressure to open the counter-balance valve 300. Upon step 2006 being complete, control progresses along path 2026 to step 2008. At step 2008, the control valve 700, 800 that is connected with the meter-out chamber 116, 118 is configured in the flow control mode. Upon step 2008 being completed, control passes along path 2028 to step 2010. At step 2010, a pressure Phead, Prod is used to initialize a reference signal. As mentioned above, the chamber 116 corresponds with the pressure Phead, and the chamber 118 corresponds with the pressure Prod. Upon the reference signal being initialized at step 2010, control passes along path 2030 to step 2012.

At step 2012, a control signal is generated to the control valve 700, 800 that is connected with the meter-in chamber 116, 118. The control signal is generated based on the measurement of the meter-out chamber pressure Phead, Prod and the reference signal. Upon step 2012 being complete, control passes along path 2032 to step 2014. At step 2014, the control signal is adjusted based on the measurement of the meter-out chamber pressure Phead, Prod. Upon step 2014 being complete, control passes along path 2034 to step 2016. At step 2016, the reference signal is continuously updated. Upon step 2016 being complete, control passes along path 2036 to decision point 2018.

At decision point 2018, an evaluation is made if the boom bounce reduction is enabled. Upon the boom bounce reduction being enabled, control passes along path 2038 and proceeds to step 2012. Upon the boom bounce reduction being disabled, control passes along path 2040 to end point 2020. End point 2020 terminates the flowchart 2000.

This application relates to U.S. Provisional Patent Application Ser. No. 61/829,796, filed on May 31, 2013, entitled Hydraulic System and Method for Reducing Boom Bounce with Counter-Balance Protection; Ser. No. 61/872,424, filed on Aug. 30, 2013, entitled Control Method and System for Using a Pair of Independent Hydraulic Metering Valves to Reduce Boom Oscillations; Ser. No. 61/904,340, filed on Nov. 14, 2013, entitled Control Strategy for Reducing Boom Oscillation; and Ser. No. 61/904,347, filed on Nov. 14, 2013, entitled Pilot Control Mechanism for Boom Bounce Reduction, which are hereby incorporated by reference in their entireties.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method of controlling a hydraulic actuator hydraulically coupled to a pair of counter-balance valves, the method comprising:
   providing the hydraulic actuator, the hydraulic actuator including a pair of chambers hydraulically coupled to the pair of counter-balance valves;
   providing a pair of control valves hydraulically coupled to the pair of counter-balance valves;
   operating one of the pair of control valves in a pressure control mode;
   operating the other of the pair of control valves in a flow control mode;
   transferring hydraulic fluid flow with the pair of control valves to/from the hydraulic actuator via the pair of counter-balance valves; and
   sending a first control signal to one of the pair of control valves and a second control signal to the other of the pair of control valves, at least one of the first and second control signals including a vibration component to transfer a vibratory cancellation flow of hydraulic fluid to the hydraulic actuator.

2. The method of controlling a hydraulic actuator of claim 1, further including the step of determining which of the pair of chambers of the hydraulic actuator is a load-holding chamber, and operating the control valve associated with the load-holding chamber in the flow control mode.

3. The method of controlling a hydraulic actuator of claim 1, further including receiving a pressure input signal from a pressure sensor in fluid communication with one of the pair of chambers of the hydraulic actuator, wherein the vibration component is at least partially based on the pressure input signal.

4. The method of controlling a hydraulic actuator of claim 1, further comprising:
   pressurizing a first pilot of a first counter-balance valve of the pair of counter-balance valves with the second control valve and thereby opening the first counter-balance valve;
   pressurizing a second pilot of a second counter-balance valve of the pair of counter-balance valves with the first control valve and thereby opening the second counter-balance valve;
   monitoring a first hydraulic flow through the first control valve;
   monitoring a second hydraulic flow through the second control valve;
   testing for a fault condition of a hydraulic line between the second counter-balance valve and the second control valve; and
   indicating a hydraulic line fault if the fault condition is present.

5. The method of controlling a hydraulic actuator of claim 4, further comprising:
   regulating an output pressure from the first control valve if the hydraulic line fault is indicated and if a lower-override command is indicated;
   regulating a pilot pressure that is pressurizing the second pilot of the second counter-balance valve by the regulating of the output pressure from the first control valve; and
   throttling the second counter-balance valve by the regulating of the pilot pressure and thereby lowering an apparatus actuated by the hydraulic actuator.

6. The method of controlling a hydraulic actuator of claim 4, further comprising:
   operating the first control valve in a flow control mode if the hydraulic line fault is indicated and if a lower-override command is indicated;
   providing a pilot pressure that is pressurizing the second pilot of the second counter-balance valve by regulating flow output from the first control valve; and
   throttling the second counter-balance valve by the providing of the pilot pressure and thereby lowering an apparatus actuated by the hydraulic actuator.

7. The method of controlling a hydraulic actuator of claim 4, further comprising:
   testing for a stuck condition of one or both of the counter-balance valves; and
   indicating a valve fault if the stuck condition is present.

8. The method of controlling a hydraulic actuator of claim 7, wherein the testing for the stuck condition includes operating at least a corresponding one of the control valves in the flow control mode, commanding a test amount of flow to a tank through the corresponding one of the control valves with the hydraulic actuator stationary, and monitoring a pressure from the corresponding one of the control valves when the test amount flows to the tank, and wherein the indicating of the valve fault occurs if the pressure is not sufficiently reduced when the test amount flows to the tank.

9. The method of controlling a hydraulic actuator of claim 7, wherein the testing for the stuck condition includes determining whether a first chamber or a second chamber of the pair of chambers is a meter-out chamber, monitoring a pressure of the meter-out chamber, and wherein the indicating of the valve fault occurs if the pressure is abnormally high.

10. A method of controlling a hydraulic actuator, the method comprising:
    providing the hydraulic actuator, the hydraulic actuator including a pair of chambers;
    providing a pair of control valves hydraulically coupled to the pair of chambers; and
    controlling the hydraulic actuator to have a non-zero actuation velocity by sending a first control signal to one of the pair of control valves and a second control signal to the other a the pair of control valves to transfer hydraulic fluid flow to and from the hydraulic actuator, wherein at least one of the first and second control signals includes a vibration component to transfer a vibratory cancellation flow of hydraulic fluid to the hydraulic actuator.

11. The method of controlling a hydraulic actuator of claim 10, further comprising:
    operating one of the pair of control valves in a flow control mode; and operating another of the pair of control valves in a pressure control mode.

12. The method of controlling a hydraulic actuator of claim 11, wherein one of the pair of chambers is a load holding chamber and wherein the one of the pair of control valves that is operated in the flow control mode is associated with the load holding chamber.

13. The method of controlling a hydraulic actuator of claim 11, further including receiving a pressure input signal from a pressure sensor in fluid communication with one of the pair of chambers of the hydraulic actuator, wherein the vibration component is at least partially based on the pressure input signal.

14. The method of controlling a hydraulic actuator of claim 11, further comprising:
providing a pair of counter-balance valves in fluid communication with the pair of chambers of the hydraulic actuator and with the pair of control valves.

15. The method of controlling a hydraulic actuator of claim 14, further comprising:
pressurizing a first pilot of a first counter-balance valve of the pair of counter-balance valves with a second control valve of the pair of control valves and thereby opening the first counter-balance valve; and
pressurizing a second pilot of a second counter-balance valve of the pair of counter-balance valves with a first control valve of the pair of control valves and thereby opening the second counter-balance valve.

16. A method of controlling a hydraulic actuator, the method comprising:
providing the hydraulic actuator, the hydraulic actuator including a pair of chambers hydraulically coupled to a pair of counter-balance valves;
providing a pair of control valves hydraulically coupled to the pair a counter-balance valves; and
controlling the hydraulic actuator to have a non-zero actuation velocity by sending a first control signal to one of the pair of control valves and a second control signal to the other of the pair of control valves to transfer hydraulic fluid flow to and from the hydraulic actuator, wherein at least one of the first and second control signals includes a vibration component to transfer a vibratory cancellation flow of hydraulic fluid to the hydraulic actuator.

17. The method of controlling a hydraulic actuator of claim 16, further comprising:
operating one of the pair of control valves in a flow control mode; and
operating another of the pair of control valves in a pressure control mode.

18. The method of controlling a hydraulic actuator of claim 17, wherein one of the pair of chambers is a load holding chamber and wherein the one of the pair of control valves that is operated in the flow control mode is associated with the load holding chamber.

19. The method of controlling a hydraulic actuator of claim 16, further including receiving a pressure input signal from a pressure sensor in fluid communication with one of the pair of chambers of the hydraulic actuator, wherein the vibration component is at least partially based on the pressure input signal.

* * * * *